US 9,417,620 B2

(12) United States Patent
Terada et al.

(10) Patent No.: US 9,417,620 B2
(45) Date of Patent: Aug. 16, 2016

(54) NUMERICAL CONTROL DEVICE

(71) Applicants: Koji Terada, Tokyo (JP); Masakazu Sagasaki, Tokyo (JP)

(72) Inventors: Koji Terada, Tokyo (JP); Masakazu Sagasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/425,564

(22) PCT Filed: Dec. 4, 2012

(86) PCT No.: PCT/JP2012/081415
§ 371 (c)(1),
(2) Date: Mar. 3, 2015

(87) PCT Pub. No.: WO2014/038101
PCT Pub. Date: Mar. 13, 2014

(65) Prior Publication Data
US 2015/0227130 A1     Aug. 13, 2015

(30) Foreign Application Priority Data

Sep. 4, 2012 (JP) .................. PCT/JP2012/072501

(51) Int. Cl.
*G06F 19/00* (2011.01)
*G05B 19/19* (2006.01)
(Continued)

(52) U.S. Cl.
CPC .............. *G05B 19/19* (2013.01); *B23B 3/162* (2013.01); *B23Q 1/52* (2013.01); *G05B 19/4093* (2013.01); *B23Q 2220/002* (2013.01); *G05B 2219/34015* (2013.01)

(58) Field of Classification Search
CPC .................. G05B 19/18; G05B 19/19; G05B 2219/33131; G05B 2219/34015; B23Q 1/52; B23Q 2220/002
See application file for complete search history.

(56) References Cited

U.S. PATENT DOCUMENTS 4,635,340 A    1/1987  Link
4,683,787 A    8/1987  Link
(Continued)

FOREIGN PATENT DOCUMENTS

DE    112011104832 T5    10/2013
JP         2-41801 A      2/1990
(Continued)

OTHER PUBLICATIONS

Merdol, S. Doruk, and Yusuf Altintas. "Virtual cutting and optimization of three-axis milling processes." International Journal of Machine Tools and Manufacture 48.10 (2008): 1063-1071.*
(Continued)

*Primary Examiner* — Michael D Masinick
(74) *Attorney, Agent, or Firm* — Sughrue Mion, PLLC; Richard C. Turner

(57) ABSTRACT

A numerical control device controls a machine tool having an X axis for moving a turret to which tools are attached, a Z axis for moving work, and a B axis for rotating the turret and having at least one of an H axis for rotating the turret around a center line perpendicular to the center line of rotation of the B axis and a C axis for rotating the work around a center line parallel to the Z axis. The numerical control device includes a unit that performs, during an virtual Y-axis inclined surface machining mode, virtual Y inclined surface machining for moving the tool along the Y axis relatively to the inclined surface in a state in which the tool is inclined such that a center axis is perpendicular to an inclined surface inclined from the X axis and the Z axis.

10 Claims, 19 Drawing Sheets

(51) Int. Cl.
  G05B 19/4093 (2006.01)
  B23B 3/16 (2006.01)
  B23Q 1/52 (2006.01)

(56) References Cited

U.S. PATENT DOCUMENTS

| | | | | |
|---|---|---|---|---|
| 5,471,395 | A * | 11/1995 | Brien | G05B 19/4068 318/568.19 |
| 5,682,319 | A * | 10/1997 | Boland | G05B 19/4068 318/573 |
| 5,933,353 | A * | 8/1999 | Abriam | G05B 19/4097 700/171 |
| 5,977,736 | A * | 11/1999 | Nakazato | B23Q 15/013 318/568.17 |
| 6,324,949 | B1 | 12/2001 | Link et al. | |
| 6,909,939 | B1 | 6/2005 | Yamada | |
| 8,694,160 | B2 * | 4/2014 | Yasue | G05B 19/18 700/250 |
| 2002/0073812 | A1 * | 6/2002 | Yamazaki | B23B 51/04 82/118 |
| 2005/0171624 | A1 * | 8/2005 | Nagashima | G05B 19/056 700/23 |
| 2006/0242818 | A1 * | 11/2006 | Penick | B23Q 1/012 29/560 |
| 2008/0132146 | A1 * | 6/2008 | Yonezu | B24B 5/42 451/5 |
| 2011/0307212 | A1 * | 12/2011 | Nishikawa | G01B 21/042 702/152 |
| 2013/0166059 | A1 * | 6/2013 | Terada | G05B 19/182 700/189 |
| 2013/0204427 | A1 * | 8/2013 | Terada | G05B 19/19 700/192 |
| 2013/0257340 | A1 * | 10/2013 | Sagasaki | G05B 19/4067 318/569 |
| 2013/0317641 | A1 * | 11/2013 | Terada | G05B 19/182 700/186 |
| 2014/0114465 | A1 * | 4/2014 | Terada | G05B 19/4083 700/194 |
| 2014/0156056 | A1 * | 6/2014 | Kotake | G05B 19/404 700/174 |
| 2015/0120036 | A1 * | 4/2015 | Yahaba | G05B 19/18 700/184 |
| 2015/0227130 | A1 * | 8/2015 | Terada | B23B 3/162 700/186 |

FOREIGN PATENT DOCUMENTS

| | | |
|---|---|---|
| JP | 3-33441 B2 | 5/1991 |
| JP | 2000-218422 A | 8/2000 |
| JP | 3959482 B2 | 8/2007 |
| JP | 2009-15464 A | 1/2009 |
| JP | 2010-102733 A | 5/2010 |
| JP | 4888619 B1 | 2/2012 |

OTHER PUBLICATIONS

Hsieh, Jung-Fa, and Psang Dain Lin. "Production of multifluted drills on six-axis CNC tool-grinding machine." International Journal of Machine Tools and Manufacture 43.11 (2003): 1117-1127.*
Swami, B. Malleswara, K. SunilRatna Kumar, and C. H. Ramakrishna. "Design and Structural Analysis of CNC Vertical Milling Machine Bed." International Journal of Advanced Engineering Technology 3.4 (2012): 97-100.*
International Search Report of PCT/JP2012/081415, dated Feb. 26, 2013. [PCT/ISA/210].
Communication dated Jun. 3, 2016, issued by the German Patent and Trademark Office in counterpart German Application No. 112012006872.6.
Moriwaki, T. "Multi-functional machine tool." CIRP Annals-Manufacturing Technology, vol. 57, 2008, No. 2, pp. 736 to 749. —ISSN 1726-0604.

* cited by examiner

FIG.6
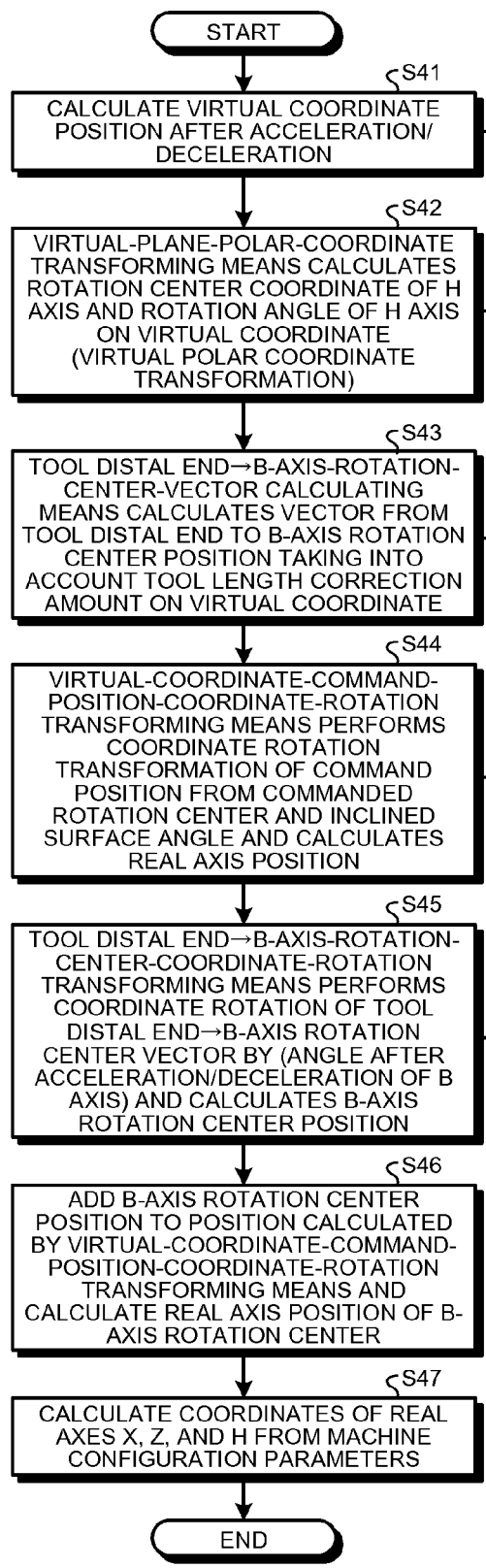
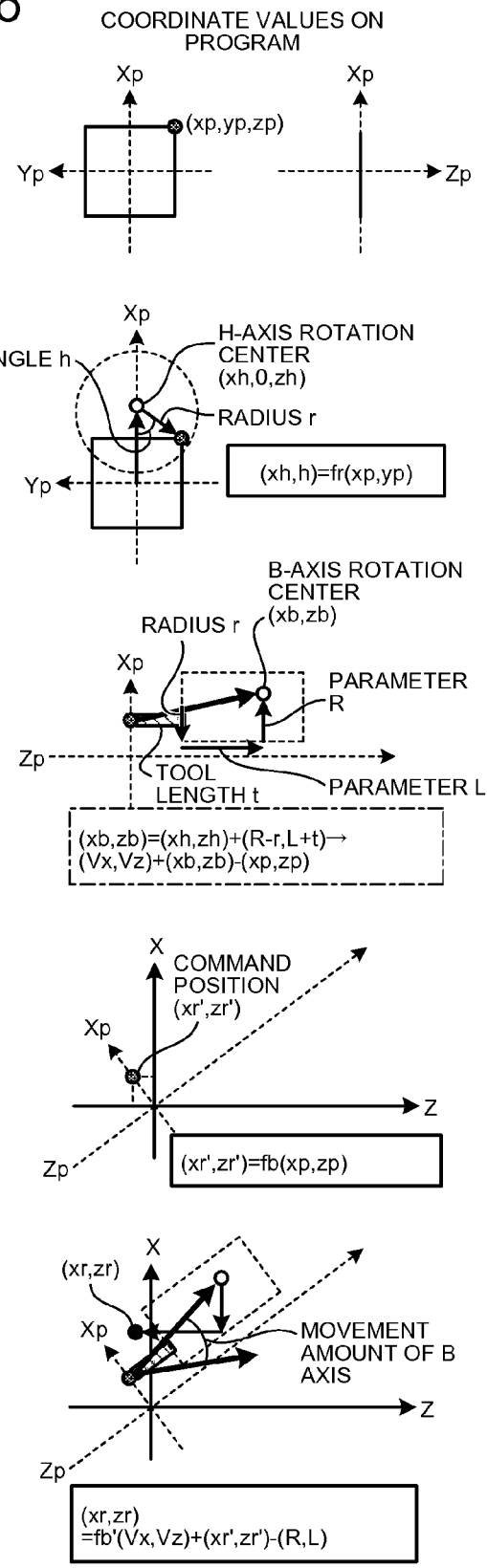

FIG.7
(a)
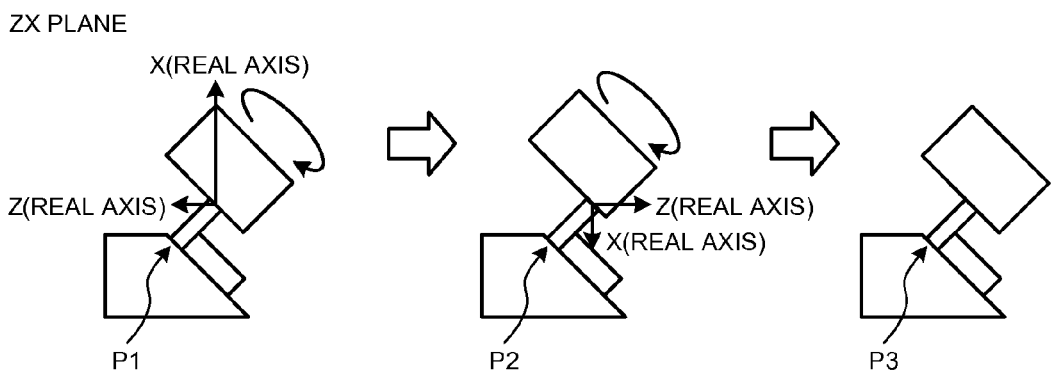
(b)
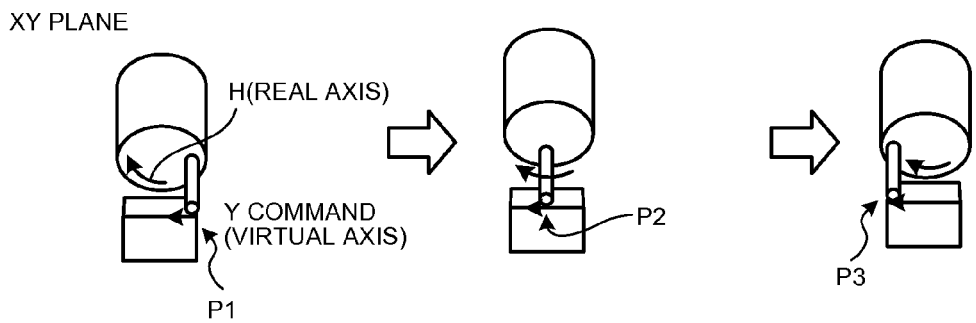
(c)　　　　　　　(d)　　　　　　　(e)
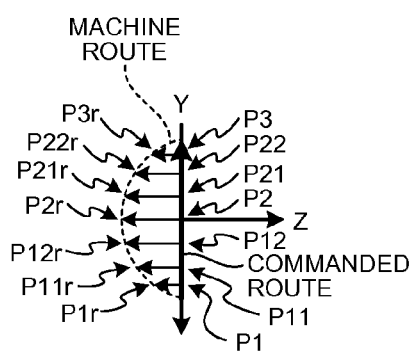 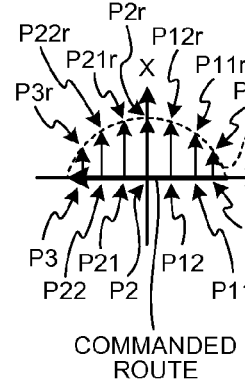 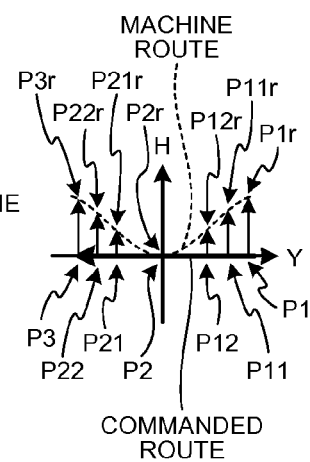

FIG.8

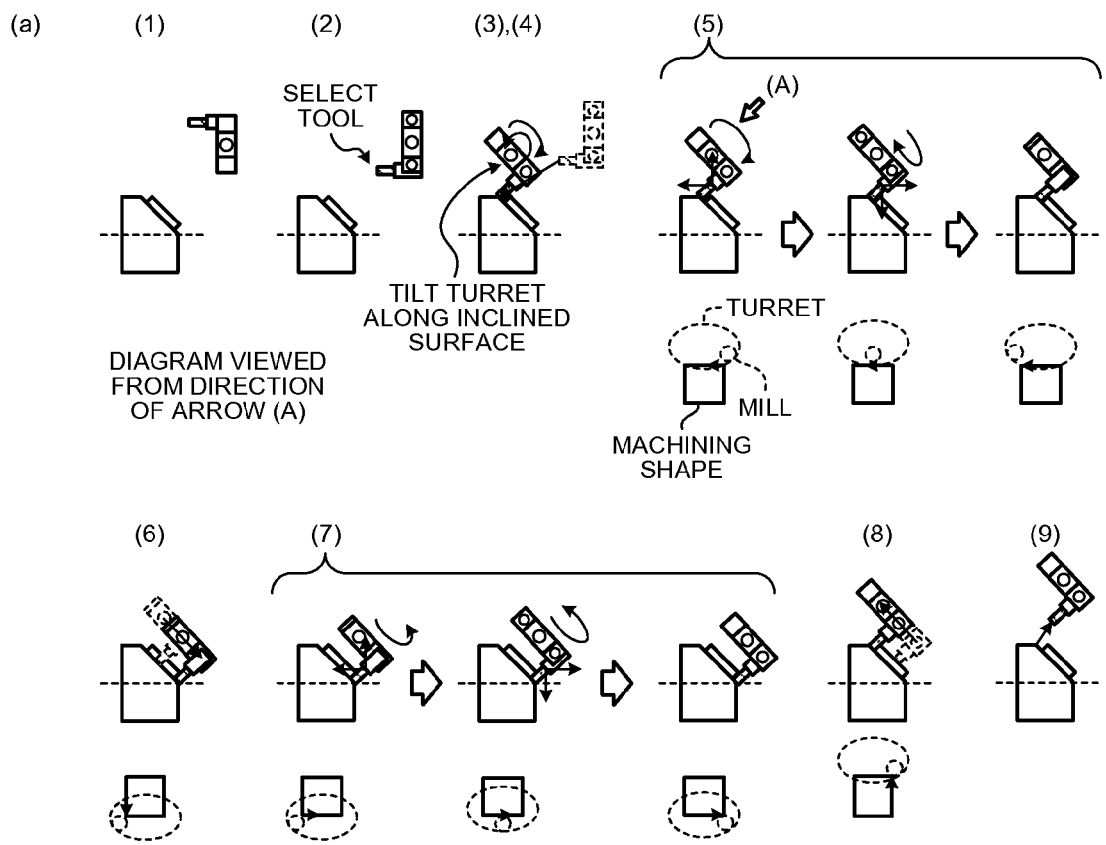

(b)
```
G0 Z30. C0 ······(1)
T1010 ······(2)
M37 B45. X0. Z0. ······(3)
G0 X50. Y50. Z0. ······(4)
G1 X50. Y-50. F100 ······(5)
G1 X-50. Y-50. ······(6)
G1 X-50. Y50. ······(7)
G1 X50. Y50. ······(8)
G0 Z30. ······(9)
M38 ······(10)
```
COMMAND POSITION WITH VIRTUAL COORDINATES (c) (2) SELECT TOOL FOR MILLING
(3) ENABLE VIRTUAL Y-AXIS INCLINED SURFACE MACHINING MODE
→ENABLE WITH SIGNAL ON BY PLC
COMMAND INCLINED SURFACE ANGLE AND ROTATION CENTER COORDINATE AS WELL
(4) POSITION IN MACHINING START POSITION
→STARTUP OPERATION
ROTATE TURRET SUCH THAT TOOL AUTOMATICALLY TURNS TO DIRECTION PERPENDICULAR TO INCLINED SURFACE
(5) CUT IN Y-AXIS (-) DIRECTION
(6) CUT IN X-AXIS (-) DIRECTION
(7) CUT IN Y-AXIS (+) DIRECTION
(8) CUT IN X-AXIS (+) DIRECTION
(9) RETRACT TOOL IN Z-AXIS DIRECTION
(10) DISABLE VIRTUAL Y-AXIS INCLINED SURFACE MACHINING MODE
→CANCEL WITH SIGNAL OFF BY PLC

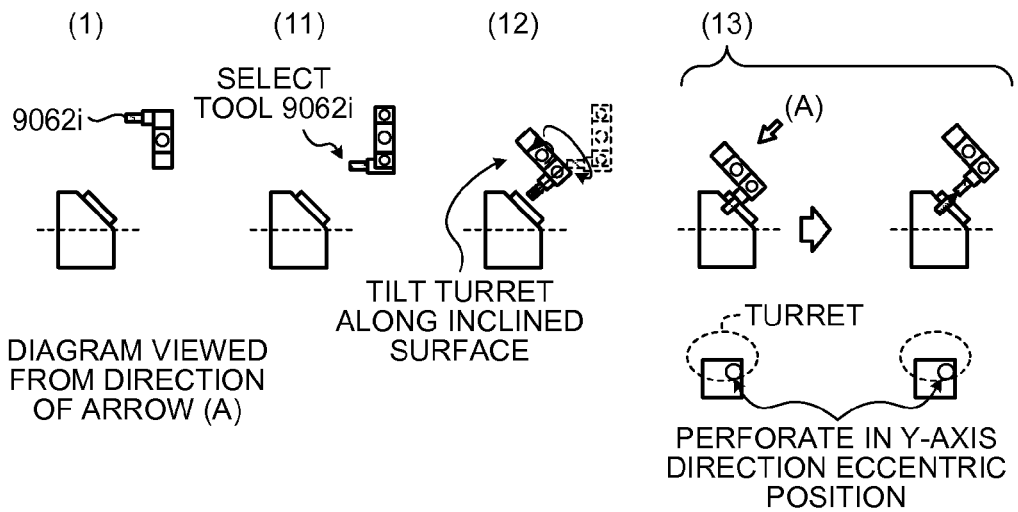

(b)
```
G0 Z30. C0     ······(1)
T1111          ······(11)
M37 B45. X0. Z0.  ······(3)
G0 X30. Y15. Z30.  ······(12)
G84 Z-10. S100 F1. D5  ······(13)
M38            ······(10)
```
} COMMAND POSITION WITH VIRTUAL COORDINATES (c) (11) SELECT TOOL FOR PERFORATING
(3) ENABLE VIRTUAL Y-AXIS INCLINED SURFACE MACHINING MODE
→ENABLE WITH SIGNAL ON BY PLC
COMMAND INCLINED SURFACE ANGLE AND ROTATION CENTER
COORDINATE AS WELL
(12) POSITION IN MACHINING START POSITION
→STARTUP OPERATION
ROTATE TURRET SUCH THAT TOOL AUTOMATICALLY TURNS TO
DIRECTION PERPENDICULAR TO INCLINED SURFACE
(13) PERFORATE IN Y-AXIS DIRECTION OF INCLINED SURFACE RETURN
TO START POSITION
(10) DISABLE VIRTUAL Y-AXIS INCLINED SURFACE MACHINING MODE
→CANCEL WITH SIGNAL OFF BY PLC

FIG.11

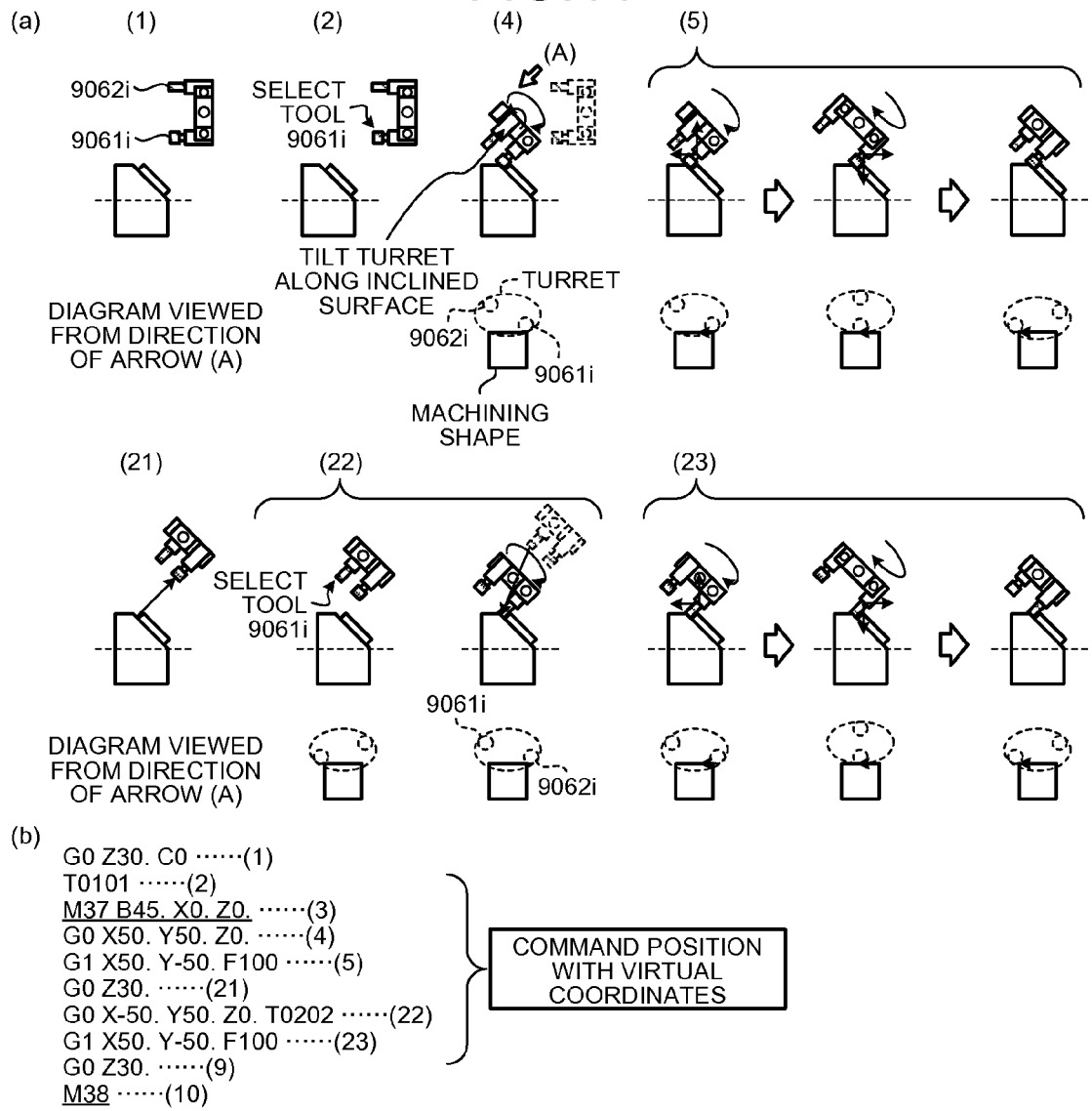

(c) (2) SELECT TOOL FOR MILLING (T01) FOR ROUGH MACHINING
(3) ENABLE VIRTUAL Y-AXIS INCLINED SURFACE MACHINING MODE
  → ENABLE WITH SIGNAL ON BY PLC
COMMAND INCLINED SURFACE ANGLE AND ROTATION CENTER COORDINATE AS WELL
(4) POSITION IN MACHINING START POSITION
  →STARTUP OPERATION
ROTATE TURRET SUCH THAT TOOL AUTOMATICALLY TURNS TO DIRECTION
PERPENDICULAR TO INCLINED SURFACE
(5) CUT IN Y-AXIS (-) DIRECTION
(21) RETRACT TOOL IN Z-AXIS DIRECTION
(22) SIMULTANEOUSLY PERFORM MACHINING START POSITION DETERMINATION AND
TOOL REPLACEMENT (OR WORK POSITIONING)
  →POSITION IN START POSITION AFTER TOOL COMMAND (POSITION REAL AXES IN
AXIS END POINTS IN NON-INTERPOLATED MANNER)
(23) CUT IN Y-AXIS (-) DIRECTION
(9) RETRACT TOOL IN Z-AXIS DIRECTION
(10) DISABLE VIRTUAL Y-AXIS INCLINED SURFACE MACHINING MODE
 CANCEL WITH SIGNAL OFF BY PLC

FIG.15
(a)
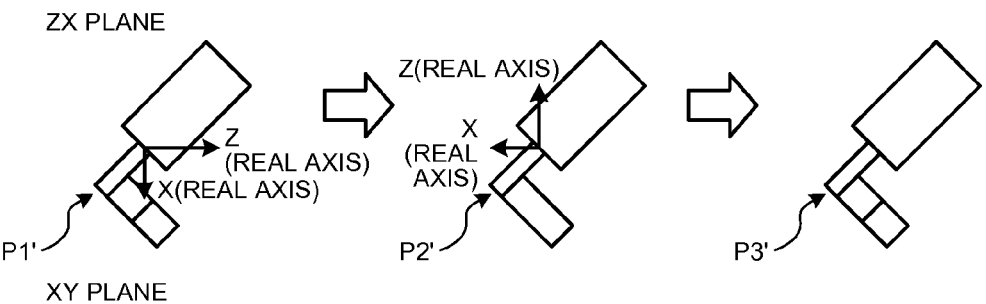
(b)
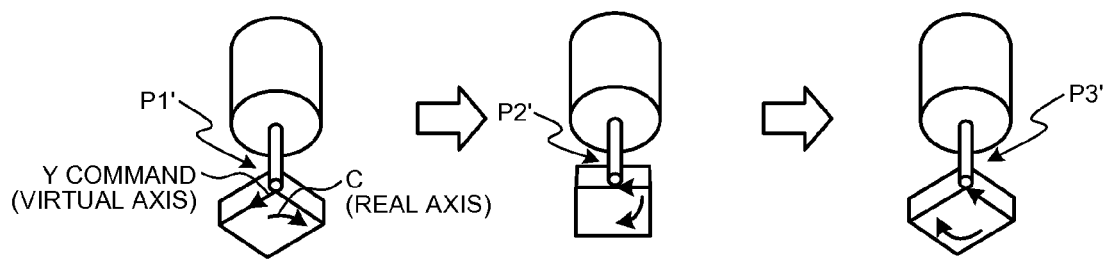
(c) 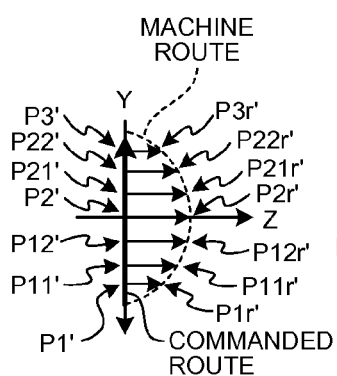
(d) 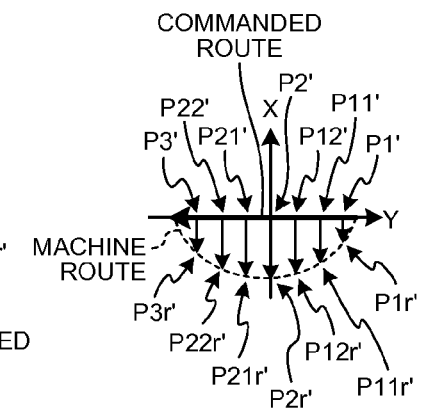
(e) 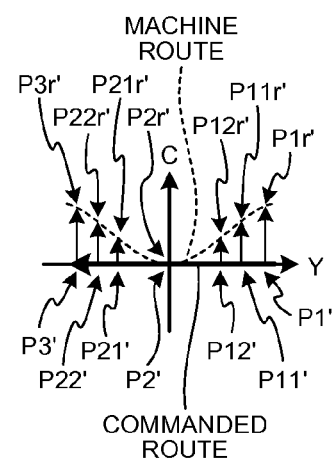

(1)    (2)    (3)

NUMERICAL CONTROL DEVICE

CROSS REFERENCE TO RELATED APPLICATIONS

This application is a National Stage of International Application No. PCT/JP2012/081415 filed Dec. 4, 2012, claiming priority based on International Application No. PCT/JP2012/072501, filed Sep. 4, 2012, the contents of all of which are incorporated herein by reference in their entirety.

FIELD

The present invention relates to a numerical control device.

BACKGROUND

Patent Literature 1 describes an NC turret lathe not having a Y axis. The NC turret lathe has an Z axis for performing a feeding operation for work; a C axis for performing rotation of the work; an X axis, which is an axis perpendicular to the Z axis, for performing a feeding operation for a tool turret; and a turret rotation axis for performing rotation of the tool turret, but it does not have a Y axis perpendicular to the Z axis and the X axis. In such an NC turret lathe, the rotation of the C axis and the rotation of the turret rotation axis are performed in combination to cause a feeding operation in the Y-axis direction of the tool with respect to the work. Consequently, according to Patent Literature 1, it is possible to execute, using the NC turret lathe not having the Y axis, machining action as if the NC turret lathe had the Y axis.

CITATION LIST

Patent Literature

Patent Literature 1: Japanese Examined Patent Publication No. H3-33441

SUMMARY

Technical Problem

In the technology described in Patent Literature 1, virtual Y-axis control is applied to the NC turret lathe not having the Y axis by means of the C axis of the work, the X axis (the work approach axis) of the turret, and the H axis (the work turning axis). Therefore, the technology is based on the premise that machining along the Y axis is applied to the surface perpendicular to the X axis. That is, in Patent Literature 1, there is no description concerning the machining along the Y axis applied to an inclined surface that is inclined from the X axis and the Z axis.

The present invention has been devised in view of the above and it is an objective of the present invention to obtain a numerical control device that can apply, with a machine tool not having a Y axis, machining along the Y axis to an inclined surface inclined from an X axis and a Z axis.

Solution to Problem

In order to solve the problem and achieve the objective, a numerical control device is provided that controls a machine tool having an X axis for moving a turret to which a tool is attached, a Z axis for moving work, and a B axis for rotating the turret around a center line perpendicular to the X axis and the Z axis; having at least one of an H axis for rotating the turret around a center line perpendicular to a center line of rotation of the B axis and a C axis for rotating the work around a center line parallel to the Z axis; and not having a Y axis orthogonal to the X axis and the Z axis. The numerical control device includes: a unit that performs, during a virtual Y-axis inclined surface machining mode for controlling the tool to move along X-Y-Z axes relatively to the work according to an X-Y-Z axis movement command in a machining program, virtual Y inclined surface machining for moving the tool along the Y axis relatively to the inclined surface in a state in which the tool is inclined such that a center axis is perpendicular to an inclined surface inclined from the X axis and the Z axis.

Advantageous Effects of Invention

According to the present invention, during the virtual Y-axis inclined surface machining mode, in the state in which the tool is inclined such that the center axis is perpendicular to the inclined surface inclined from the X axis and the Z axis, it is possible to perform the virtual Y inclined surface machining for moving the tool along the Y axis relatively to the inclined surface. Consequently, it is possible to apply, with the machine tool not having the Y axis, the machining along the Y axis to the inclined surface inclined from the X axis and the Z axis.

BRIEF DESCRIPTION OF DRAWINGS

FIG. 6 is a flowchart for illustrating the operation during the virtual Y-axis inclined surface mode of the numerical control device according to the first embodiment.

FIG. 7 is a diagram illustrating motions of axes during the virtual Y-axis inclined surface mode of the numerical control device according to the first embodiment.

FIG. 8 is a diagram illustrating a machining procedure for work in the first embodiment.

FIG. 9 is a diagram illustrating a machining procedure for work in a modification of the first embodiment.

FIG. 11 is a diagram illustrating a machining procedure for work in the other modification of the first embodiment.

FIG. 15 is a diagram illustrating motions of axes during the virtual Y-axis inclined surface mode of the numerical control device according to the second embodiment.

DESCRIPTION OF EMBODIMENTS

Figure 1:
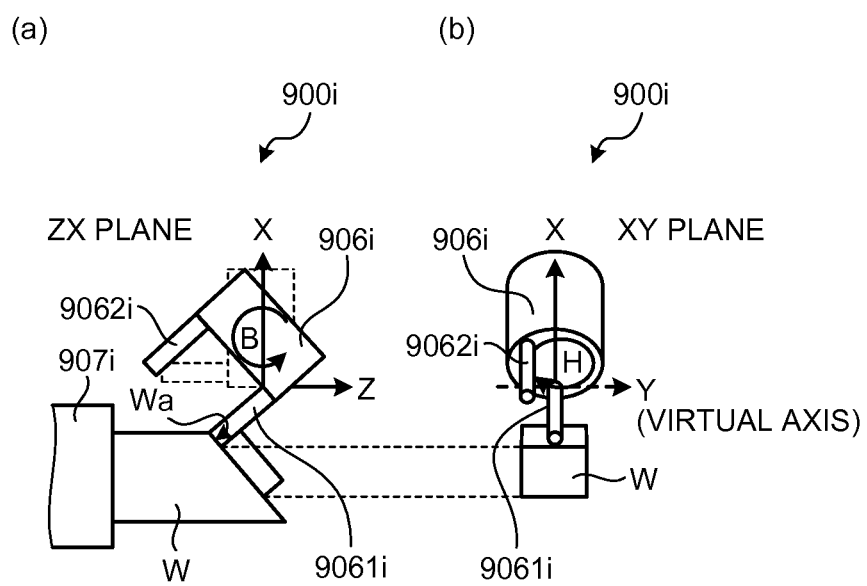
FIG. 1 is a diagram illustrating the configuration of a machine tool in a first embodiment.

Exemplary embodiments of a numerical control device according to the present invention are described in detail below with reference to the drawings. Note that the present invention is not limited by the embodiments.

First Embodiment

Before describing a numerical control device 1i according to a first embodiment, the schematic configuration of a numerical control device 1 according to a basic embodiment is described with reference to FIG. 17 and FIG. 18. FIG. 17(a) and FIG. 17(b) are respectively a perspective view and a front view of the external configuration of a machine tool 900 controlled by the numerical control device 1 according to the basic embodiment. FIG. 18 is a block diagram illustrating components of the numerical control device 1 according to the basic embodiment.

The machine tool 900 includes, as illustrated in FIGS. 17(a) and 17(b), a turret 906 and a work supporting section 907. The machine tool 900 has an X axis; a Z axis; an H axis; a C axis; and a principal axis. The X axis is a moving axis for moving the turret 906. The Z axis is a moving axis for moving work W. The H axis is a rotation axis for rotating the turret 906 around a rotation center line parallel to the Z axis to turn tools 9061 and 9062. Center axes of the tools 9061 and 9062 radially extend from the rotation center line of the H axis. The C axis is a rotation axis for rotating the work W around a rotation center line parallel to the Z axis. The principal axis is a rotation axis for rotating the work supporting section 907 around a rotation center line along the Z axis.

Figure 17:
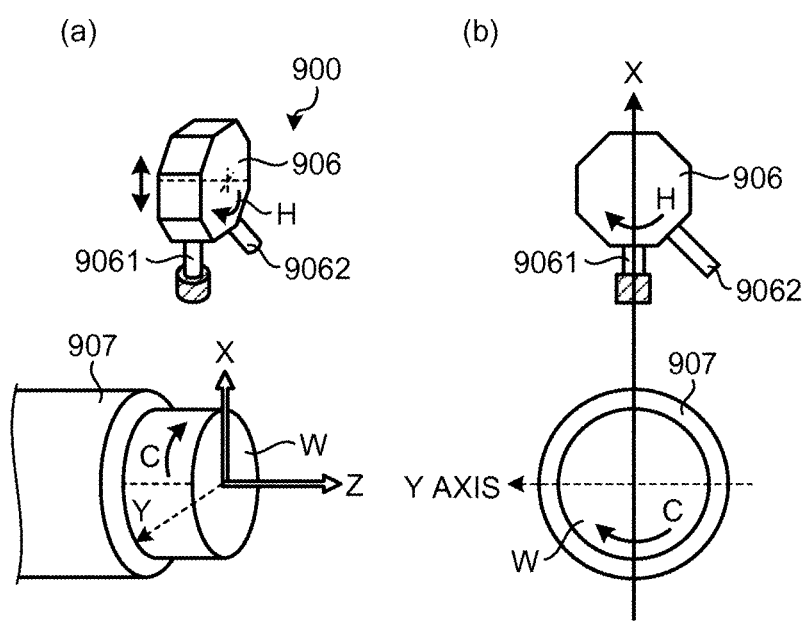
FIG. 17 is a diagram illustrating the configuration of a machine tool in a basic embodiment.
Figure 18:
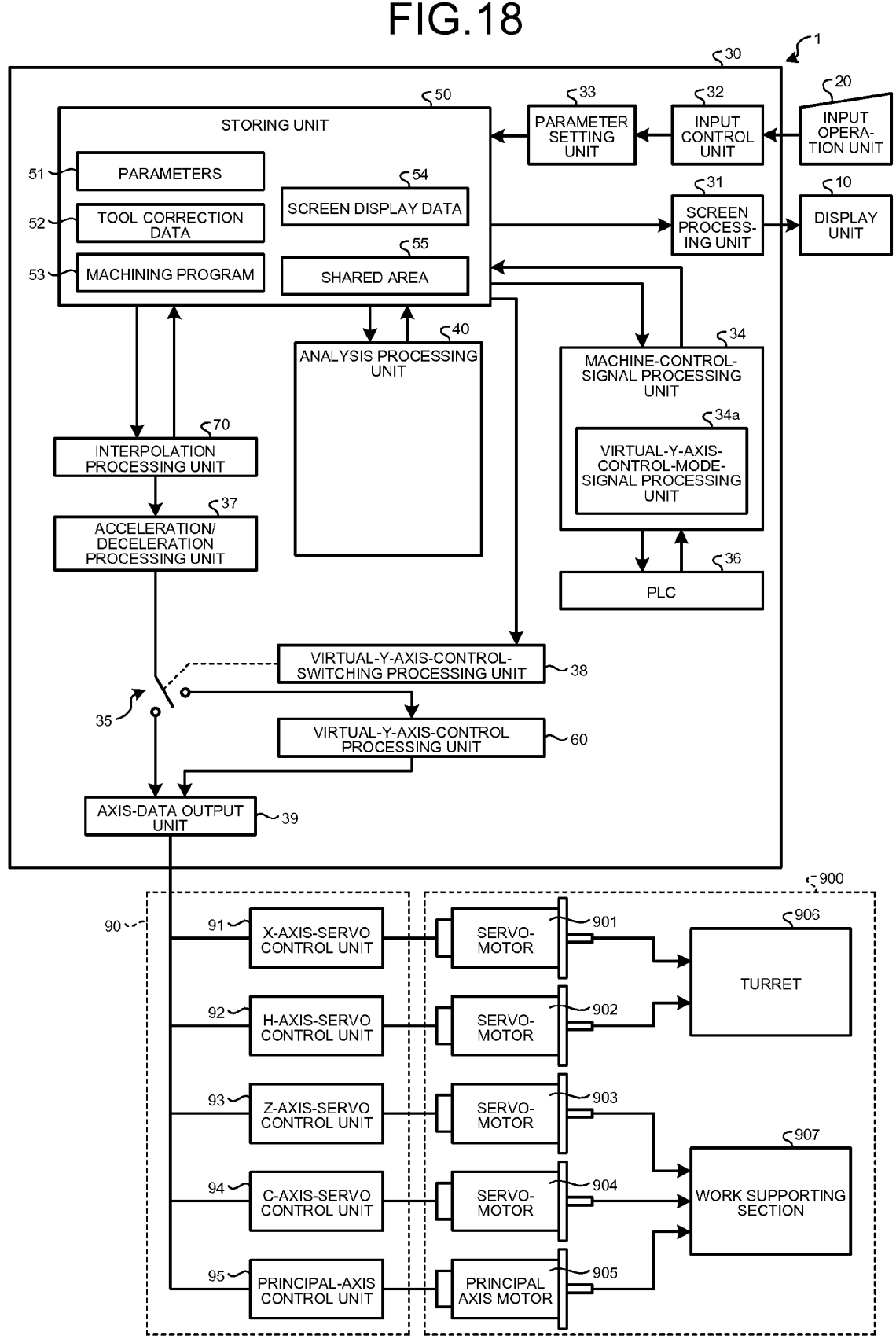
FIG. 18 is a diagram illustrating the configuration of a numerical control device according to the basic embodiment.

Note that, in FIG. 17, a Y axis perpendicular to the X axis and the Z axis is indicated by a broken line. The Y axis is a virtual moving axis used in a virtual Y-axis control mode in a machining program created by a user. In the virtual Y-axis control mode, the user designates coordinate positions of the X axis, the Y axis, the Z axis, the H axis, and the C axis and creates a necessary machining program.

The machine tool 900 further includes, as illustrated in FIG. 18, servomotors 901, 902, 903, and 904 respectively for X-axis, H-axis, Z-axis, and C-axis as well as a principal axis motor 905. The X-axis servomotor 901 and the H-axis servomotor 902 perform movement of the X axis and rotation of the H axis with respect to the turret 906. The Z-axis servomotor 903 and the C-axis servomotor 904 perform movement of the Z axis and rotation of the C axis with respect to the work supporting section 907. The principal axis motor 905 performs rotation of the principal axis.

The numerical control device 1 includes a display unit 10; an input operation unit 20; a control operation unit 30; and a driving unit 90. For example, according to operation of an automatic start button of a machining program 53 by the user, a signal for an automatic start of the machining program 53 is supplied to the control operation unit 30. In response to the signal, the control operation unit 30 starts the machining program 53; generates a movement amount command for the X axis, a rotation amount command for the H axis, and a movement amount command for the Z axis, and a rotation amount command for the C axis according to the machining program 53; and supplies the commands to the driving unit 90. The driving unit 90 includes an X-axis-servo control unit 91; an H-axis-servo control unit 92; a Z-axis-servo control unit 93; a C-axis-servo control unit 94; and a principal-axis control unit 95. The driving unit 90 drives the X-axis servomotor 901, the H-axis servomotor 903, the Z-axis servomotor 903, the C-axis servomotor 904, and the principal axis motor 905 according to the movement amount command for the X axis, the rotation amount command for the H axis, the movement amount command for the Z axis, and the rotation amount command for the C axis input from the control operation unit 30.

The control operation unit 30 includes a programmable logic controller (PLC) 36; a machine-control-signal processing unit 34; a storing unit 50; an analysis processing unit 40; an interpolation processing unit 70; an virtual Y-axis-control-switching processing unit 38; a switch 35, an acceleration/deceleration processing unit 37; an virtual Y-axis-control processing unit 60; an axis-data output unit 39; an input control unit 32; a screen processing unit 31; and a parameter setting unit 33.

The signal for the automatic start of the machining program 53 is input to the machine-control-signal processing unit 34 through the PLC 36. The machine-control-signal processing unit 34 commands the analysis processing unit 40 through the storing unit 50 to start the machining program 53.

The storing unit 50 stores parameters 51, tool correction data 52, a machining program 53, and screen display data 54 and includes a shared area 55 functioning as a work space.

The analysis processing unit 40 calculates a tool correction amount and causes the storing unit 50 to store the tool correction amount as tool correction data 52. The analysis processing unit 40 reads out the machining program 53 from the storing unit 50 according to a start command for the machining program 53 and performs analysis processing for respective blocks (respective rows) of the machining program 53. If an M code (e.g., an M code "M111" or "M101") is included in the analyzed blocks (rows), the analysis processing unit 40 passes a result of the analysis to the PLC 36 through the storing unit 50 and the machine-control-signal processing unit 34. If a code (e.g., a G code "G0" or "G1") other than the M code is included in the analyzed rows, the analysis processing unit 40 adds a tool correction amount to the analysis result and passes the analysis result to the interpolation processing unit 70.

When the PLC 36 receives an analysis result of virtual Y-axis control mode ON (e.g., the M mode "M111"), the PLC 36 changes an virtual Y-axis control mode signal of an virtual Y-axis control mode-signal processing unit 34a in the machine-control-signal processing unit 34 into an ON state and causes the storing unit 50 to temporarily store the virtual Y-axis control mode signal in the shared area 55. Consequently, in the numerical control device 1, the virtual Y-axis control mode starts. The units of the numerical control device 1 refer to the virtual Y-axis control mode signal (in the ON state) of the shared area 55 to thereby recognize that the numerical control device 1 is in the virtual Y-axis control mode. When the PLC 36 receives an analysis result of virtual Y-axis control mode OFF (e.g., the M code "M101"), the PLC 36 changes the virtual Y-axis control mode signal of the virtual Y-axis control mode-signal processing unit 34a in the machine-control-signal processing unit 34 to an OFF state and causes the storing unit 50 to temporarily store the virtual Y-axis control mode signal in the shared area 55. Consequently, in the numerical control device 1, the virtual Y-axis control mode is cancelled. The numerical control device 1 changes to a control mode other than the virtual Y-axis control mode.

The interpolation processing unit 70 receives the analysis result (a position command) from the analysis processing unit 40, performs interpolation processing for the analysis result (the position command), and supplies a result of the interpolation processing (a movement amount and a rotation amount) to the acceleration/deceleration processing unit 37.

The acceleration/deceleration processing unit 37 applies acceleration/deceleration processing to the result of the interpolation processing supplied from the interpolation processing unit 70. The acceleration/deceleration processing unit 37 outputs an acceleration/deceleration processing result concerning the X axis, the Y axis, the C axis, the H axis, and the principal axis to the switch 35 and directly outputs an acceleration/deceleration processing result concerning the Z axis to the axis-data output unit 39.

The switch 35 outputs, on the basis of a switching signal from the virtual Y-axis-control-switching processing 38, the acceleration/deceleration processing result to any one of the virtual Y-axis-control processing unit 60 and the axis-data output unit 39. In the virtual Y-axis control mode in which the virtual Y-axis control mode signal in the shared area 55 is ON, the virtual Y-axis-control-switching processing unit 38 switches the switch 35 to connect the acceleration/deceleration processing unit 37 and the virtual Y-axis-control processing unit 60. In the control mode other than the virtual Y-axis control mode in which the virtual Y-axis control mode signal in the shared area 55 is OFF, the virtual Y-axis-control-switching processing unit 38 switches the switch 35 to connect the acceleration/deceleration processing unit 37 and the axis-data output unit 39.

In the virtual Y-axis control mode, the virtual Y-axis-control processing unit 60 transforms a movement amount command for the X-Y axes input from the acceleration/deceleration processing unit 37 into a command in an X-H-C coordinate system. That is, the virtual Y-axis-control processing unit 60 transforms the movement amount command for the X-Y axes input from the acceleration/deceleration processing unit 37 into a moving position command (X1, Y1); performs coordinate-transformation of the transformed moving position command into a moving position command for the X axis, a rotating position command for the H axis, and a rotating position command for the C axis, which are moving position commands for a machine coordinate system serving as a real coordinate system; and calculates moving positions (Xr, Hr, Cr) of the X axis, the H axis, and the C axis. Consequently, the virtual Y-axis-control processing unit 60 drives the X axis, the H axis, and the C axis in association with one another via the driving unit 90.

Figure 19:
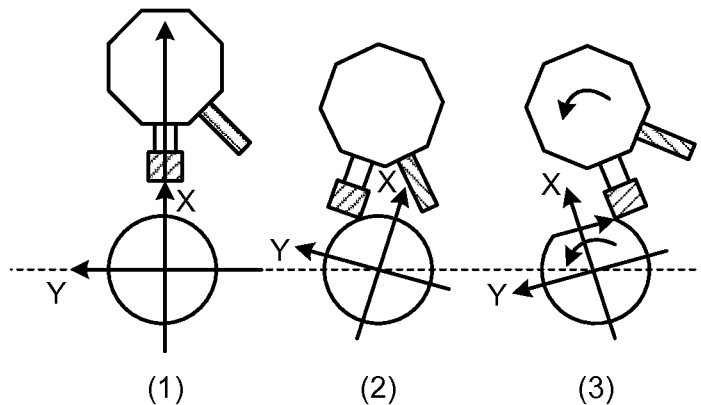
FIG. 19 is a diagram illustrating the operation of the numerical control device in the basic embodiment.
Figure 20:
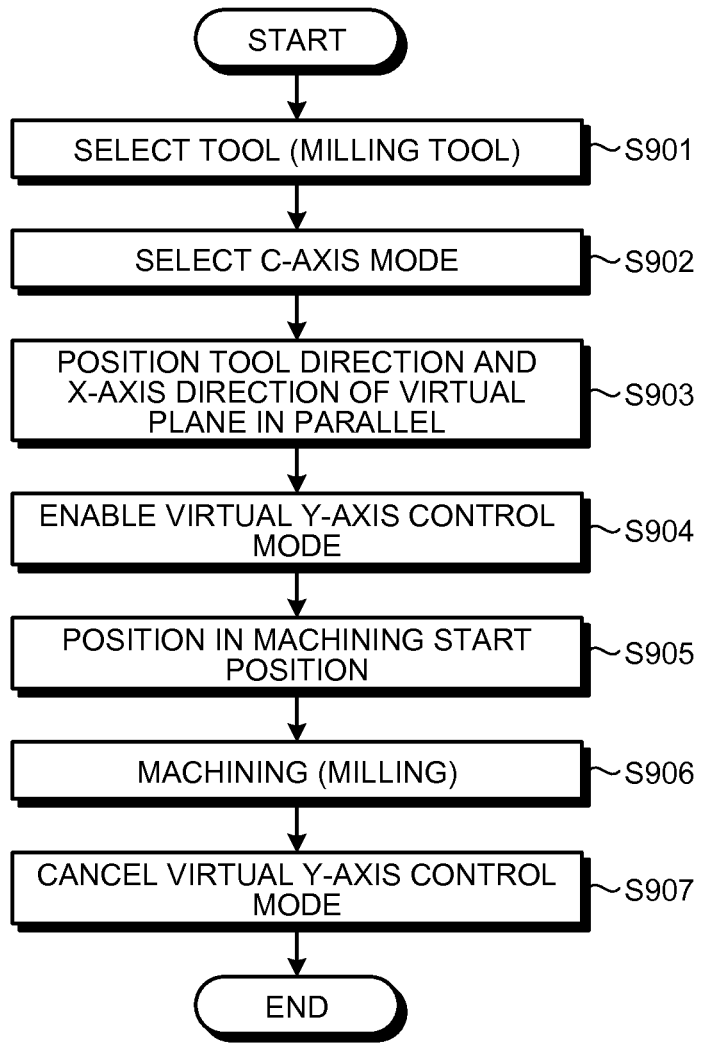
FIG. 20 is a flowchart for illustrating the operation of the numerical control device in the basic embodiment.

For example, the numerical control device 1 controls machining of the work W illustrated in FIG. 19 and FIG. 20. FIG. 19 is a diagram illustrating the operation of the numerical control device 1. FIG. 20 is a flowchart for illustrating the operation of the numerical control device 1.

At step S901 illustrated in FIG. 20, the numerical control device 1 selects the tool 9061 for milling as a tool that should be used for machining and replaces a machining tool with the tool 9061.

At step S902, the numerical control device 1 selects a C-axis mode.

At step S903, the numerical control device 1 positions the turret 906 and the work W at a position where the center axis of the tool 9061 and the X-axis direction on an virtual plane are parallel to each other (see (1) illustrated in FIG. 19). The virtual plane is a plane formed by the X-axis and the virtual Y-axis and is a plane corresponding to an XY plane in a program coordinate system.

At step S904, the numerical control device 1 enables the virtual Y-axis control mode according to a description of the M code (e.g., the M code "M111") in the machining program 53.

At step S905, the numerical control device 1 moves the tool 9061 toward a machining start position according to a description of the machining program 53 (e.g., the G code "G0") (see (2) illustrated in FIG. 19).

At step S906, the numerical control device 1 drives the X axis, the H axis, and the C axis in association with one another to thereby move the tool 9061 in a direction along the Y axis (e.g., a direction parallel to the Y axis) from the machining start position to a machining end position and causes the tool 9061 to perform milling according to a description of the machining program 53 (e.g., the G code "G1") (see (3) illustrated in FIG. 19).

At step S907, the numerical control device 1 cancels the virtual Y-axis control mode according to a description of the M code (e.g., the M mode "M101") in the machining program 53.

In the basic embodiment, as illustrated in FIG. 19 and FIG. 20, the virtual Y-axis control is applied to the machine tool 900 not having the Y axis by means of the C axis of the work, the X axis of the turret, and the H axis of the turret. Therefore, the basic embodiment is based on the premise that machining along the Y axis is applied to a surface perpendicular to the X axis. That is, in the basic embodiment, it is difficult to apply the machining along the Y axis to an inclined surface inclined from the X axis and the Z axis.

Figure 2:
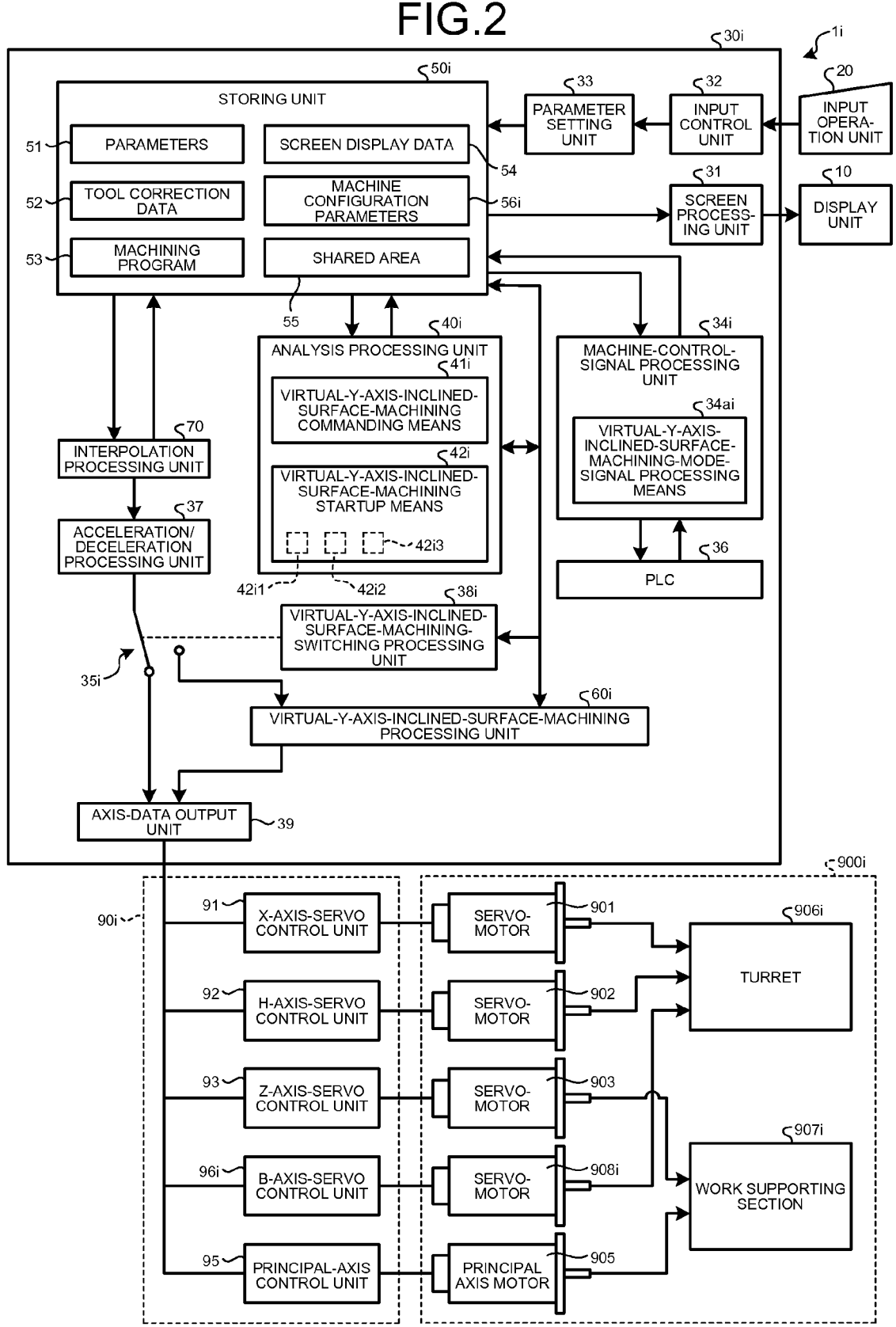
FIG. 2 is a diagram illustrating the configuration (during a startup mode) of a numerical control device according to the first embodiment.
Figure 3:
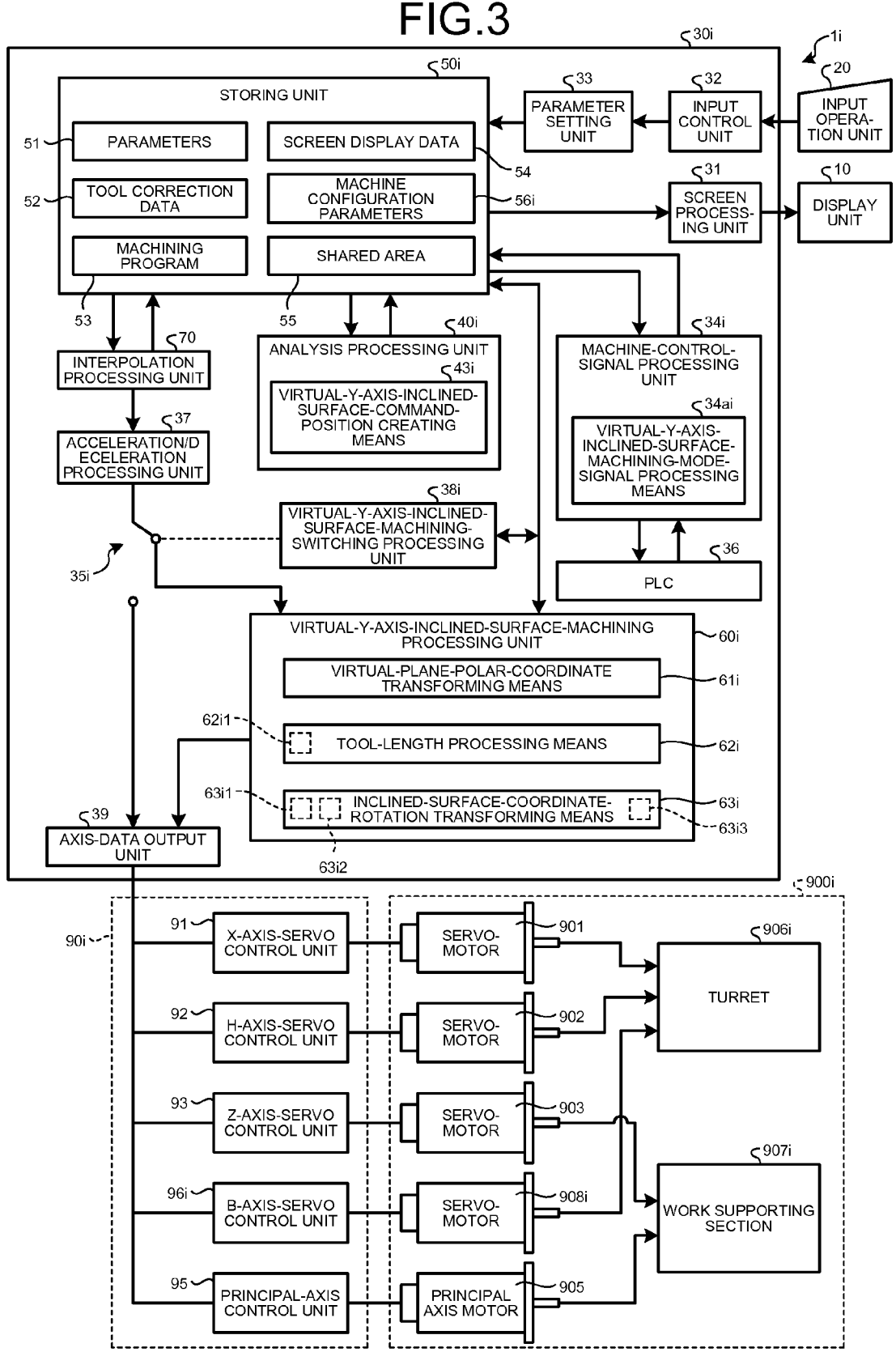
FIG. 3 is a diagram illustrating the configuration (during a virtual Y-axis inclined surface mode) of the numerical control device according to the first embodiment.

Therefore, in the first embodiment, the numerical control device 1i is devised as described below to apply the machining along the Y axis onto an inclined surface Wa (see FIG. 1(a)) inclined from the X axis and the Z axis. FIG. 1(a) and FIG. 1(b) are diagrams of external configurations of a machine tool 900i, which is controlled by the numerical control device 1i according to the first embodiment, respectively viewed from directions perpendicular to a ZX plane and an XY plane. FIG. 2 is a block diagram illustrating components related to the operation during a startup mode of the numerical control device 1i according to the first embodiment. FIG. 3 is a block diagram illustrating components related to an operation in a virtual Y-axis inclined surface mode of the numerical control device 1i according to the first embodiment. In the following description, differences from the basic embodiment are mainly described.

The machine tool 900i includes, as illustrated in FIGS. 1(a) and 1(b), a turret 906i and a work supporting section 907i. The machine tool 900i does not have the C axis and further has a B axis. The B axis is a rotation axis for rotating the turret 906i around a rotation center line perpendicular to the X axis and the Z axis, that is, around a rotation center line parallel to the Y axis so as to set the center axis of a tool 9061 inclined with respect to the X axis and the Z axis. The center axes of the tool 9061i and a tool 9062i extend in parallel to the rotation center line of the H axis.

Note that the rotation center line of the H axis tilts according to the rotation of the B axis while being maintained in a state in which the rotation center line is parallel to the center axes of the tools 9061i and 9062i and perpendicular to the rotation center line of the B axis. That is, the H axis is a rotation axis for rotating the turret 906i around a rotation center line perpendicular to the rotation center line of the B axis.

As illustrated in FIG. 2 and FIG. 3, the machine tool 900i does not include the C-axis servomotor 904 (see FIG. 18) but further includes a B-axis servomotor 908i. The B-axis servomotor 908i performs the rotation of the B axis with respect to the turret 906i. Consequently, the machine tool 900i can change the tool 9061i to an inclined state such that the center axis is perpendicular to the inclined surface Wa inclined from the X axis and the Z axis.

Note that, accordingly, a driving unit 90i does not include the C-axis-servo control unit 94 (see FIG. 18) but further includes a B-axis-servo control unit 96i.

The numerical control device 1i has an virtual Y-axis inclined surface machining mode, as a control mode for applying the machining along the Y axis to the inclined surface Wa (see FIG. 1(a)) inclined from the X axis and the Z axis. The virtual Y-axis inclined surface machining mode includes the startup mode and the virtual Y-axis inclined surface mode. In the virtual Y-axis inclined surface machining mode, the startup mode and the virtual Y-axis inclined surface mode are sequentially and selectively changed to an ON state.

For example, the numerical control device 1i includes a control operation unit 30i instead of the control operation unit 30 (see FIG. 18). The control operation unit 30i includes a machine-control-signal processing unit 34i, a storing unit 50i, an analysis processing unit 40i, an virtual Y-axis-inclined-surface-machining-switching processing unit 38i, a switch 35i, and an virtual Y-axis-inclined-surface-machining processing unit 60i respectively instead of the machine-control-signal processing unit 34, the storing unit 50, the analysis processing unit 40, the virtual Y-axis-control-switching processing unit 38, the switch 35, and the virtual Y-axis-control processing unit 60.

The storing unit 50i further stores machine configuration parameters 56i. The machine configuration parameters 56i include, for example, tool length t of the tool 9061i and parameters (R, L) indicating a distance from a base position of the tool 9061i to the B axis rotation center and the like (see FIG. 5).

The analysis processing unit 40i includes a virtual Y-axis-inclined-surface-machining commanding unit 41i and a virtual Y-axis-inclined-surface-machining startup unit 42i (see FIG. 2). If an M code (e.g., an M code "M37" illustrated in FIG. 8(b)) indicating enabling of virtual Y inclined surface machining in the machining program 53 is included, the virtual Y-axis-inclined surface-machining commanding unit 41i passes an analysis result of the M code to the PLC 36 through the storing unit 50i and a virtual Y-axis-inclined-surface-machining-mode-signal processing unit 34ai of the machine-control-signal processing unit 34i. The virtual Y-axis-inclined-surface-machining commanding unit 41i causes the storing unit 50i to temporarily store, in the shared area 55, information concerning an inclined surface angle and an inclined surface rotation center coordinate (e.g., "B45. X0. Z0.") included in the M code indicating the enabling of the virtual Y inclined surface machining in the machining program 53.

When the PLC 36 receives an analysis result of virtual Y-axis inclined surface machining mode ON (e.g., the M code "M37" illustrated in FIG. 8(b)), the PLC 36 changes a startup mode signal of the virtual Y-axis-inclined-surface-machining-mode-signal processing unit 34ai in the machine-control-signal processing unit 34i into an ON state and causes the storing unit 50i to temporarily store the startup mode signal in the shared area 55. Consequently, in the numerical control device 1i, a startup mode in the virtual Y-axis inclined surface machining mode starts; and the units refer to the startup mode signal (in the ON state) in the shared area 55 so as to thereby recognize that the numerical control device 1i is in the startup mode.

Because the numerical control device 1i is in the startup mode, the virtual Y-axis-inclined-surface-machining-switching processing unit 38i switches the switch 35i to connect the acceleration/deceleration processing unit 37 and the axis-data output unit 39 (see FIG. 2).

Because the numerical control device 1i is being in the startup mode, the virtual Y-axis-inclined-surface-machining startup unit 42i transforms a movement start position corresponding to an X-Y-Z axis movement command in the machining program 53 into a command in an X-Z-H-B coordinate system; drives the X axis, the Z axis, the H axis, and the B axis in association with one another according to the transformed command; and performs a startup operation. The startup operation is an operation for changing the tool 9061i into an inclined state such that the center axis is perpendicular to the inclined surface Wa of the work W and is an operation for moving the tool 9061i to a machining start position of the work W (see FIG. 5). Note that the startup operation is performed in a non-interpolated manner.

For example, the virtual Y-axis-inclined-surface-machining startup unit 42i includes a virtual-plane-polar-coordinate transforming unit 42i1, a tool-length processing unit 42i2, and an inclined-surface-coordinate-rotation transforming unit 42i3. The virtual-plane-polar-coordinate transforming unit 42i1 calculates a polar coordinate of the H axis in the program coordinate system according to the movement start position corresponding to the X-Y-Z axis movement command in the machining program 53. The polar coordinate of the H axis includes a rotation center coordinate of the H axis and a rotation angle of the H axis. The rotation center coordinate of the H axis indicates a coordinate of the rotation center of the H axis in the program coordinate system. The rotation angle of the H axis is a rotation coordinate indicating a rotation angle from a reference rotating position of the H axis centering on the rotation center of the H axis. For example, the virtual-plane-polar-coordinate transforming unit 42i1 transforms X-Y-Z axis command positions into a polar coordinate of the H axis in the program coordinate system (see FIG. 5).

The tool-length processing unit 42i2 corrects the calculated rotation center coordinate of the H axis taking into account the tool length of the tool 9061i and supplies parameters corresponding to the corrected rotation center coordinate of the H axis to the inclined-plane-coordinate-rotation transforming unit 42i3.

The inclined-surface-coordinate-rotation transforming unit 42i3 refers to the shared area 55 of the storing unit 50i and acquires a commanded inclined surface angle and a commanded inclined surface rotation center. The inclined-surface-coordinate-rotation transforming unit 42i3 calculates, using the parameters corresponding to the corrected rotation center coordinate of the H axis in the program coordinate system, a moving position command for the X axis and a moving position command for the Z axis for moving the X axis and the Z axis when the B axis is rotated according to the commanded inclined surface angle and the commanded inclined surface rotation center. That is, the inclined-surface-coordinate-rotation transforming unit 42i3 calculates the moving position command for the X axis, the moving position command for the Z axis, a rotating position command for the H axis, and a rotating position command for the B axis, which are moving position commands for the machine coordinate system serving as a real coordinate system, according to the corrected rotation center coordinate of the H axis in the program coordinate system and the commanded inclined surface angle and the commanded inclined surface rotation center; and calculates moving positions (Xr, Zr, Hr, Br) of the X axis, the Z axis, the H axis, and the B axis. Consequently, the analysis processing unit 40*i* drives the X axis, the Z axis, the H axis, and the B axis in association with one another via the driving unit 90*i*.

When the virtual Y-axis-inclined-surface-machining-switching processing unit 38*i* recognizes that the associated driving (the startup operation) is completed, the virtual Y-axis-inclined-surface-machining-switching processing unit 38*i* changes the startup signal of the virtual Y-axis-inclined-surface-machining-mode-signal processing unit 34*ai* in the machine-control-signal processing unit 34*i* into an OFF state; changes an virtual Y-axis inclined surface mode signal into an ON state; and causes the storing unit 50*i* to temporarily store the virtual Y-axis inclined surface mode signal in the shared area 55. In the numerical control device 1*i*, consequently, stars the virtual Y-axis inclined surface mode in the virtual Y-axis inclined surface machining mode. The units refer to the virtual Y-axis inclined surface mode signal (the ON state) in the shared area 55 so as to thereby recognize that the numerical control device 1*i* is in the virtual Y-axis inclined surface mode.

Because the numerical control device 1*i* is in the virtual Y-axis inclined surface mode, the virtual Y-axis-inclined-surface-machining-switching processing unit 38*i* switches the switch 35*i* to connect the acceleration/deceleration processing unit 37 and the virtual Y-axis-inclined-surface-machining processing unit 60*i* (see FIG. 3).

Because the numerical control device 1*i* is in the virtual Y-axis inclined surface mode, the analysis processing unit 40*i* and the virtual Y-axis-inclined-surface-machining processing unit 60*i* transform the X-Y-Z axis movement command in the machining program into a command in an X-Z-H coordinate system and performs, according to the transformed command, virtual Y inclined surface interpolation for driving the X axis, the Z axis, and the H axis in association with one another.

For example, the analysis processing unit 40*i* further includes virtual Y-axis-inclined-surface-command-position creating unit 43*i* (see FIG. 3). The virtual Y-axis-inclined-surface-command-position creating unit 43*i* controls the interpolation processing unit 70 such that it interpolates the X-Y-Z axis positions in the program coordinate system according to the X-Y-Z axis movement command in the machining program 53. The interpolated X-Y-Z axis positions in the program coordinate system are supplied to the virtual Y-axis-inclined-surface-machining processing unit 60*i* through the acceleration/deceleration processing unit 37.

For example, the virtual Y-axis-inclined-surface-machining processing unit 60*i* includes a virtual-plane-polar-coordinate transforming unit 61*i*, a tool-length processing unit 62*i*, and an inclined-surface-coordinate-rotation transforming unit 63*i*. The virtual-plane-polar-coordinate transforming unit 61*i* receives the interpolated X-Y-Z axis positions in the program coordinate system. The virtual-plane-polar-coordinate transforming unit 61*i* calculates a polar coordinate of the H axis in the program coordinate system according to the interpolated X-Y-Z axis positions in the program coordinate system. The polar coordinate of the H axis includes a rotation center coordinate of the H axis and a rotation angle of the H axis. The rotation center coordinate of the H axis indicates a coordinate of the rotation center of the H axis. The rotation angle of the H axis is a rotation coordinate indicating a rotation angle from a reference rotating position of the H axis centering on the rotation center of the H axis. For example, the virtual-plane-polar-coordinate transforming unit 61*i* transforms the interpolated X-Y-Z axis positions into a polar coordinate of the H axis in the program coordinate system (see FIG. 6).

The tool-length processing unit 62*i* corrects the calculated rotation center coordinate of the H axis taking into account the tool length of the tool 9061*i*. For example, the tool-length processing unit 62*i* includes a "tool distal end to B-axis-rotation-center-vector calculating unit" 62*i*1. The tool-length processing unit 62*i* applies tool length correction to the rotation center coordinate of the H axis using the "tool distal end to B-axis-rotation-center-vector calculating unit" 62*i*1 and supplies parameters corresponding to the corrected rotation center coordinate of the H axis to the inclined-surface-coordinate-rotation transforming unit 63*i*.

The inclined-surface-coordinate-rotation transforming unit 63*i* refers to the shared area 55 of the storing unit 50*i* and acquires the commanded inclined surface angle and the commanded inclined surface rotation center. The inclined-surface-coordinate-rotation transforming unit 63*i* calculates, using the parameters corresponding to the corrected rotation center coordinate of the H axis in the program coordinate system, a moving position command for the X axis and a moving position command for the Z axis for moving the X axis and the Z axis when the B axis is rotated according to the commanded inclined surface angle and the commanded inclined surface rotation center. That is, the inclined-surface-coordinate-rotation transforming unit 63*i* calculates the moving position command for the X axis, the moving position command for the Z axis, and a rotating position command for the H axis, which are moving position commands for the machine coordinate system serving as a real coordinate system, according to the corrected rotation center coordinate of the H axis in the program coordinate system and the commanded inclined surface angle and the commanded inclined surface rotation center; and the inclined-surface-coordinate-rotation transforming unit 63*i* calculates moving positions (Xr, Zr, Hr) of the X axis, the Z axis, and the H axis. For example, the inclined-surface-coordinate-rotation transforming unit 63*i* includes a virtual-coordinate-command-position-coordinate-rotation transforming unit 63*i*1; a "tool distal end to B-axis-rotation-center-coordinate-rotation transforming unit" 63*i*2; and a combining unit 63*i*3. The inclined-surface-coordinate-rotation transforming unit 63*i* calculates the moving positions (Xr, Zr, Hr) of the X axis, the Z axis, and the H axis by using the "tool distal end to B-axis-rotation-center-coordinate-rotation transforming unit" 63*i*2 and the combining unit 63*i*3. Consequently, the analysis processing unit 40*i* drives the X axis, the Z axis, and the H axis in association with one another via the driving unit 90*i*.

When the PLC 36 receives an analysis result of virtual Y-axis inclined surface machining mode OFF (e.g., an M code "M38" illustrated in FIG. 8(*b*)), the PLC 36 changes the virtual Y-axis inclined surface mode signal of the virtual Y-axis-inclined-surface-machining-mode-signal processing unit 34*ai* in the machine-control-signal processing unit 34*i* to an OFF state and causes the storing unit 50*i* to temporarily store the virtual Y-axis inclined surface mode signal in the shared area 55. Consequently, in the numerical control device 1*i*, the virtual Y-axis inclined surface machining mode is cancelled. The numerical control device 1*i* changes into a control mode other than the virtual Y-axis inclined surface machining mode.

Figure 4:
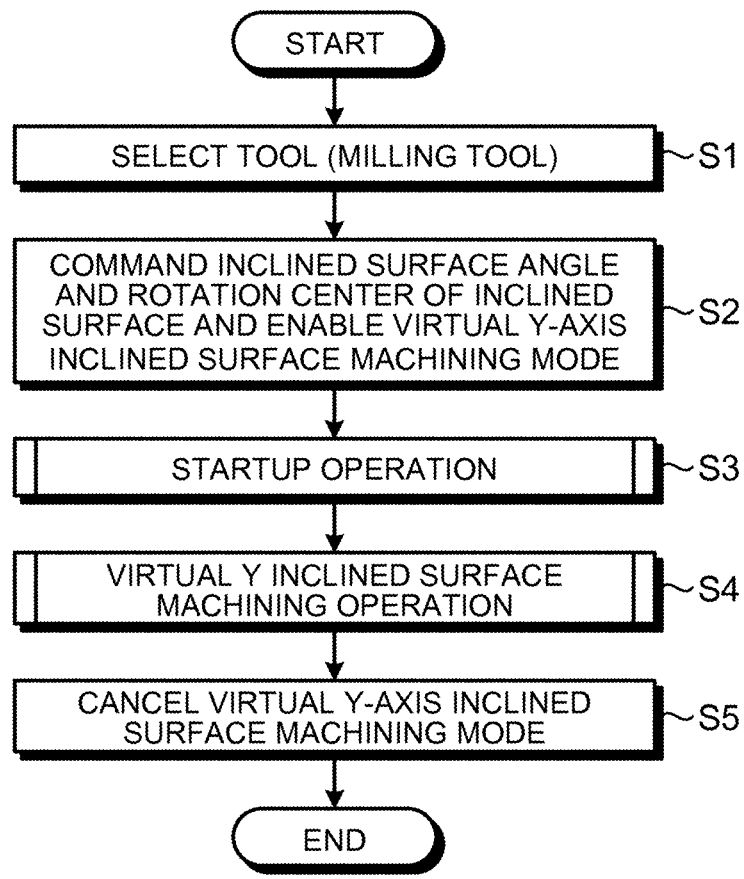
FIG. 4 is a flowchart for illustrating the operation of the numerical control device according to the first embodiment.

The operation of the numerical control device 1i according to the first embodiment is described with reference to FIG. 4 and FIG. 8(b). FIG. 4 is a flowchart for illustrating the operation of the numerical control device 1i according to the first embodiment. FIG. 8(b) is a diagram illustrating description contents in the machining program 53 stored in the storing unit 50i of the numerical control device 1i.

At step S1, the numerical control device 1i selects, for example, the tool 9061i for milling as the tool that should be used for machining and replaces the tool used for machining with the tool 9061i. For example, the numerical control device 1i replaces the tool used for machining with the tool 9061i for milling according to a description of "T1010" in the machining program 53 illustrated in FIG. 8(b).

At step S2, the numerical control device 1i commands an inclined surface angle and a rotation center of an inclined surface so as to enable the virtual Y-axis inclined surface machining mode. For example, the numerical control device 1i commands a rotation angle of 45 degrees of the B axis as the inclined surface angle; commands a position (Xp, Zp)=(0, 0) in the program coordinate system as the rotation center of the inclined surface; and changes the startup mode in the virtual Y-axis inclined surface machining mode into ON according to a description of "M37 B45. X0. Z0." in the machining program 53 illustrated in FIG. 8(b).

At step S3, because the numerical control device 1i is in the startup mode, the numerical control device 1i performs a startup operation. Details of the startup operation are described below. When the startup operation is completed, the numerical control device 1i changes the startup mode in the virtual Y-axis inclined surface machining mode into OFF and changes the virtual Y-axis inclined surface mode in the virtual Y-axis inclined surface machining mode into ON.

At step S4, because the numerical control device 1i is in the virtual Y-axis inclined surface mode, the numerical control device 1i performs an virtual Y inclined surface machining operation (e.g., milling). Details of the virtual Y inclined surface machining operation are described below.

At step S5, the numerical control device 1i cancels the virtual Y-axis inclined surface machining mode. For example, the numerical control device 1i changes the virtual Y-axis inclined surface mode in the virtual Y-axis inclined surface machining mode into OFF according to a description of "M38" in the machining program 53 illustrated in FIG. 8(b).

Figure 5:
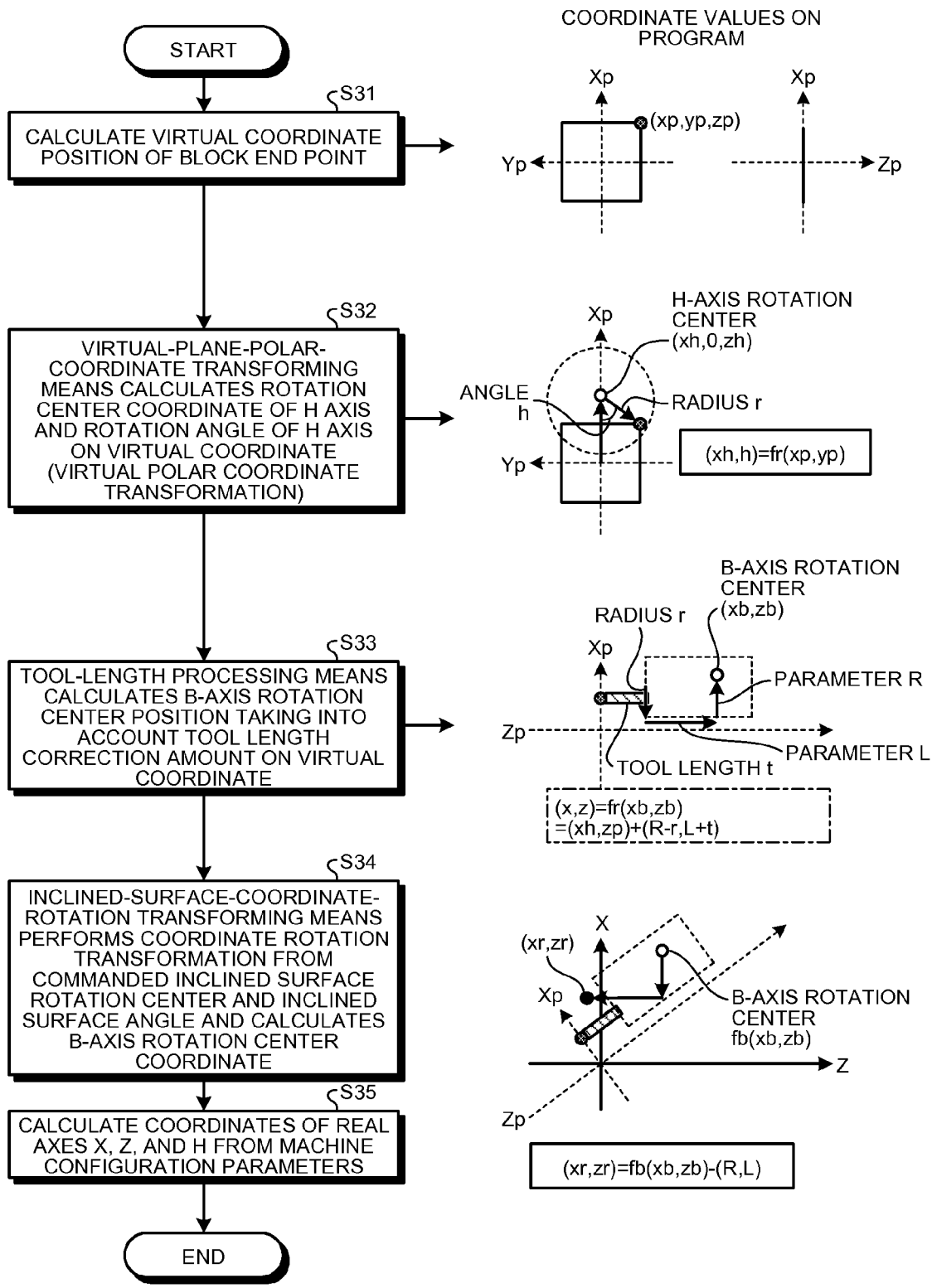
FIG. 5 is a flowchart for illustrating the operation during the startup mode of the numerical control device according to the first embodiment.

Details of the startup operation (step S3) are described with reference to FIG. 5 and FIG. 8(b). FIG. 5 is a flowchart for illustrating the details of the startup operation (step S3).

At step S31, the numerical control device 1i calculates an virtual coordinate position of a block end point, that is, a machining start position (Xp, Yp, Zp)=(xp, yp, zp) in the program coordinate system. For example, the numerical control device 1i calculates a machining start position (Xp, Yp, Zp)=(50, 50, 0) according to a description of "G0 X50. Y50. Z0." in the machining program 53 illustrated in FIG. 8(b).

At step S32, the virtual-plane-polar-coordinate transforming unit 42i1 (see FIG. 2) in the numerical control device 1i calculates a polar coordinate (xh, h) of the H axis in the program coordinate system according to a movement start position (xp, yp, zp) corresponding to the X-Y-Z axis movement command in the machining program 53. For example, the virtual-plane-polar-coordinate transforming unit 42i1 transforms, according to the following Expression 1, X-Y axis positions (xp, yp) of a movement start in the program coordinate system into the polar coordinate (xh, h) of the H axis in the program coordinate system. That is, the virtual-plane-polar-coordinate transforming unit 42i1 performs virtual polar coordinate transformation according to the following Expression 1:

$$(xh,h)=fr(xp,yp) \qquad \text{Expression 1}$$

In Expression 1, fr indicates a function used in coordinate transformation. The polar coordinate (xh, h) of the H axis includes a rotation center coordinate xh of the H axis and a rotation angle h of the H axis. The rotation center coordinate xh of the H axis indicates a coordinate (xh, 0, zh) of the rotation center of the H axis in the program coordinate system. The rotation angle h of the H axis is a rotation coordinate indicating a rotation angle from a reference rotating position (a position from the rotation center to the origin) of the H axis centering on the rotation center (xh, 0, zh) of the H axis. The virtual-plane-polar-coordinate transforming unit 42i1 supplies the calculated polar coordinate (xh, h) of the H axis to the tool-length processing unit 42i2 (see FIG. 2).

At step S33, the tool-length processing unit 42i2 calculates a B-axis rotation center position (Xp, Zp)=(xb, zb) in the program coordinate system taking into account a tool length correction amount on an virtual coordinate. For example, the tool-length processing unit 42i2 calculates, according to the following Expression 2, the B-axis rotation center position (xb, zb) taking into account the tool length correction amount with respect to the rotation center coordinate xh of the H axis and a Z-axis position (zp) of a movement start.

$$(xb,zb)=(xh,zp)+(R-r,L+t) \qquad \text{Expression 2}$$

In Expression 2, t represents tool length of a tool; r represents a rotation radius of the H axis in the turret 906i; R represents a distance in the X-axis direction from the base of the tool to the B-axis rotation center in the turret 906i; and L represents a distance in the Z-axis direction from the base of the tool to the B-axis rotation center in the turret 906i. The tool-length processing unit 42i2 supplies the B-axis rotation center position (xb, zb) calculated taking into account the tool length correction amount to the inclined-surface-coordinate-rotation transforming unit 42i3 as a parameter corresponding to the corrected rotation center coordinate of the H axis.

At step S34, the inclined-surface-coordinate-rotation transforming unit 42i3 coordinate-transforms, according to the commanded inclined surface angle and the commanded inclined surface rotation center, the B-axis rotation center position in the program coordinate system into a B-axis rotation center position in the machine coordinate system. For example, the inclined-surface-coordinate-rotation transforming unit 42i3 coordinate-transforms the B-axis rotation center position (Xp, Zp)=(xb, zb) calculated taking into account the tool length correction amount in the program coordinate system into a B-axis rotation center position fb (xb, zb) in the machine coordinate system. In the B-axis rotation center position fb (xb, zb), fb indicates a function used in the coordinate transformation.

At step S35, the inclined-surface-coordinate-rotation transforming unit 42i3 calculates coordinates of real axes (Xr, Zr, Hr) using the machine configuration parameters (R, L). For example, the inclined-surface-coordinate-rotation transforming unit 42i3 calculates, according to the following Expression 3, coordinates (xr, zr) of the X-Z axes in the machine coordinate system from the B-axis rotation center position fb (xb, zb) in the machine coordinate system.

$$(xr,zr)=fb(xb,zb)-(R,L) \qquad \text{Expression 3}$$

The inclined-surface-coordinate-rotation transforming unit 42i3 calculates a movement start position (Xr, Zr, Hr, Br)=(xr, zr, h, br) in the machine coordinate system using the coordinates (xr, zr) of the X-Z axes; the rotation coordinate (h) of the H axis calculated at step S32; and the commanded inclined surface angle calculated at step S34, that is, the rotation coordinate (br) of the B axis. The analysis processing unit 40$i$ supplies a command of the movement start position (xr, zr, h, br) to the driving unit 90$i$ via the interpolation processing unit 70 and the acceleration/deceleration processing unit 37. Consequently, the driving unit 90$i$ drives the X axis, the Z axis, the H axis, and the B axis in association with one another according to the command of the movement start position (xr, zr, h, br).

Details of the virtual Y inclined surface machining operation (step S4) are described with reference to FIG. 6, FIG. 7, and FIG. 8($b$). FIG. 6 is a flowchart for illustrating the details of the virtual Y inclined surface machining operation (step S4). FIG. 7 is a diagram illustrating motions of the axes during the virtual Y-axis inclined surface mode of the numerical control device 1$i$.

At step S41, the virtual-Y-axis-inclined-surface-command-position creating unit 43$i$ (see FIG. 3) in the numerical control device 1$i$ calculates, for example, positions of a start point and an end point of a present processing target block in the machining program 53 and calculates an X-Y-Z axis movement command in the machining program 53. The interpolation processing unit 70 interpolates X-Y-Z axis positions in the program coordinate system at every interpolation cycle according to the X-Y-Z axis movement command in the machining program 53.

For example, it is assumed that a start point P1 and an end point P3 are calculated by the virtual-Y-axis-inclined-surface-command-position creating unit 43$i$, that is, the X-Y-Z axis movement command in the machining program 53 is a movement command of P1 to P3 illustrated in FIGS. 7($c$) to 7($e$). In this case, the interpolation processing unit 70 performs interpolation processing at every interpolation cycle and calculates command positions P1, P11, P12, P2, P21, P22, and P3 of the X-Y-Z axes in the program coordinate system. The command positions P1 to P3 are positions along the Y axis, which is the virtual axis, as illustrated in FIGS. 6($a$) and 6($b$).

Note that FIG. 6($a$) illustrates the operation of the machine tool 900$i$ conforming to the command positions P1, P2, and P3 when viewed from a direction perpendicular to the ZX plane. FIG. 7($b$) illustrates the operation of the machine tool 900$i$ conforming to the command positions P1, P2, and P3 when viewed from a direction perpendicular to the XY plane. FIG. 7($c$) illustrates a route commanded in the program coordinate system on an YZ plane and an actual movement route in the machine coordinate system. In FIG. 7($c$), the ordinate indicates a coordinate of the Y axis and an abscissa indicates a coordinate of the Z axis. FIG. 7($d$) illustrates a route commanded in the program coordinate system on the XY plane and a movement route of the machine tool in the machine coordinate system. In FIG. 7($d$), the ordinate indicates a coordinate of the X axis and the abscissa indicates a coordinate of the Y axis. FIG. 7($e$) illustrates a route commanded in the program coordinate system on an HY plane and a movement route of the machine tool in the machine coordinate system. In FIG. 7($e$), the ordinate indicates a rotation coordinate (h) of the H axis and the abscissa indicates a coordinate of the Y axis.

For example, the numerical control device 1$i$ calculates, according to a description of "G1 X50. Y−50. F100" in the machining program 53 (see FIG. 8($b$)), an interpolation position at every interpolation cycle from a machining start position (Xp, Yp, Zp)=(50, 50, 0) to a machining end position (Xp, Yp, Zp)=(50, −50, 0) of the tool 9061$i$ in the program coordinate system; applies acceleration/deceleration processing to the interpolation position; and calculates, for example, a command position (Xp, Yp, Zp)=(xp, yp, zp) in the program coordinate system. For example, in this case, the interpolation processing unit 70 performs interpolation processing in the case of P1=(50, 50, 0) and P2=(50, −50, 0) in FIGS. 7($c$) to 7($e$) and calculates the command positions P1, P11, P12, P2, P21, P22, and P3 of the X-Y-Z axes in the program coordinate system.

At step S42, the virtual-plane-polar-coordinate transforming unit 61$i$ (see FIG. 3) in the numerical control device 1$i$ calculates the polar coordinate (xh, h) of the H axis in the program coordinate system according to the command position (xp, yp, zp) corresponding to the X-Y axis movement command in the machining program 53. For example, the virtual-plane-polar-coordinate transforming unit 61$i$ transforms, according to the above Expression 1, the command position (xp, yp) in the program coordinate system into the polar coordinate (xh, h) of the H axis in the program coordinate system. That is, the virtual-plane-polar-coordinate transforming unit 61$i$ performs virtual polar coordinate transformation according to the above Expression 1. The virtual-plane-polar-coordinate transforming unit 61$i$ supplies the calculated rotation center coordinate (xh) of the H axis to the tool-length processing unit 62$i$ (see FIG. 3).

At step S43, the tool distal end to B-axis-rotation-center-vector calculating unit 62$i$1 (see FIG. 3) in the tool-length processing unit 62$i$ calculates a vector from a tool distal end to the B-axis rotation center position in the program coordinate system taking into account a tool length correction amount on the virtual coordinate. For example, the tool distal end to B-axis-rotation-center-vector calculating unit 62$i$1 calculates a B-axis rotation center position (xb, zb) in the program coordinate system according to the above Expression 2 and calculates a vector (Vx, Vz) from a tool distal end (xp, zp) to the B-axis rotation center position (xb, zb) in the program coordinate system according to the following Expression 4.

$$(Vx, Vz) = (xb, zb) - (xp, zp) \qquad \text{Expression 4}$$

The tool distal end to B-axis-rotation-center-vector calculating unit 62$i$1 supplies the calculated vector (Vx, Vz) to the inclined-surface-coordinate-rotation transforming unit 63$i$ as a parameter corresponding to the corrected rotation center coordinate of the H axis.

At step S44, the virtual-coordinate-command-position-coordinate-rotation transforming unit 63$i$1 in the inclined-surface-coordinate-rotation transforming unit 63$i$ coordinate-transforms, according to the commanded inclined surface angle and the commanded inclined surface rotation center, the command position (xp, yp) in the program coordinate system into a command position (xr', yr') in the machine coordinate system. For example, the virtual-coordinate-command-position-coordinate-rotation transforming unit 63$i$1 coordinate-transforms the command position (xp, yp) in the program coordinate system into the command position (xr', yr') in the machine coordinate system according to the following Expression 5:

$$(xr', yr') = fb(xp, yp) \qquad \text{Expression 5}$$

At step S45, the tool distal end to B-axis-rotation-center-coordinate-rotation transforming unit 63$i$2 in the inclined-surface-coordinate-rotation transforming unit 63$i$ coordinate-transforms, according to the commanded inclined surface angle and the commanded inclined surface rotation center, the parameter corresponding to the corrected rotation center coordinate of the H axis in the program into a parameter in the machine coordinate system. For example, the tool distal end to B-axis-rotation-center-coordinate-rotation transforming unit 63i2 rotates the vector (Vx, Vz) calculated at step S43 by the commanded inclined surface angle (an angle after acceleration/deceleration of the B axis) and coordinate-transforms the vector (Vx, Vz) into a vector fb'(Vx, Vz) in the machine coordinate system. Here, fb' indicates a function used in coordinate transformation for a vector.

At step S46, the combining unit 63i3 in the inclined-surface-coordinate-rotation transforming unit 63i combines the command position (xr', yr') in the machine coordinate system calculated at step S44 and the parameter in the machine coordinate system calculated at step S45. For example, the combining unit 63i3 adds the vector fb'(Vx, Vz) in the machine coordinate system calculated at step S45 with the command position (xr', yr') in the machine coordinate system calculated at step S44 and calculates a B-axis rotation center coordinate fb'(Vx, Vz)+(xr', yr') in the machine coordinate system.

At step S47, the inclined-surface-coordinate-rotation transforming unit 63i calculates coordinates of the real axes (Xr, Zr, Hr) from the machine configuration parameters (R, L). For example, the inclined-surface-coordinate-rotation transforming unit 63i calculates the coordinates (xr, zr) of the X-Z axes in the machine coordinate system according to the following Expression 6.

$$(xr, zr) = fb'(Vx, Vz) + (xr', yr') - (R, L)$$  Expression 6

The inclined-surface-coordinate-rotation transforming unit 63i calculates a command position (Xr, Zr, Hr)=(xr, zr, h) in the machine coordinate system using the coordinates (xr, zr) of the X-Z axes and the coordinate (h) of the H axis calculated at step S42. That is, the virtual Y-axis-inclined-surface-machining processing unit 60i transforms the command position on the program coordinate system analyzed by the analysis processing unit 40i, interpolated by the interpolation processing unit 70, and subjected to the acceleration/deceleration processing by the acceleration/deceleration processing unit 37 into a command position on the machine coordinate system. The command position on the machine coordinate system is supplied to the driving unit 90i. Consequently, the driving unit 90i drives the X axis, the Z axis, and the H axis in association with one another according to the command position on the machine coordinate system.

For example, it is assumed that the X-Y-Z axis movement command in the machining program 53 is a movement command of P1 to P3 illustrated in FIGS. 7(c) to 7(e). In this case, the inclined-surface-coordinate-rotation transforming unit 63i calculates command positions P1r, P11r, P12r, P2r, P21r, P22r, and P3r of the X-Z-H axes in the machine coordinate system. The command positions P1r, P11r, P12r, P2r, P21r, P22r, and P3r of the X-Z-H axes in the machine coordinate system respectively correspond to the command positions P1, P11, P12, P2, P21, P22, and P3 of the X-Y-Z axes in the program coordinate system. The command positions P1r to P3r are realized by the associated driving of the X axis, the Z axis, and the H axis by the driving unit 90i as illustrated in FIGS. 7(a) and 7(b).

A machining procedure for the work W by the numerical control device 1i according to the first embodiment is described with reference to FIG. 8. FIG. 8(a) is a diagram illustrating motions of the turret 906i and the work W conforming to the machining procedure for the work W by the numerical control device 1i. FIG. 8(b) is a diagram illustrating description contents in the machining program 53 stored in the storing unit 50i of the numerical control device 1i. FIG. 8(c) is a diagram illustrating the machining procedure for the work W.

In a process (1), the numerical control device 1i moves the turret 906i to a reference position according to a description of "G0 Z30. C0" in the machining program 53.

In a process (2), the numerical control device 1i replaces the tool that should be used for machining with the tool 9061i for milling according to a description of "T1010" in the machining program 53.

In a process (3), the numerical control device 1i commands a rotation angle 45 degrees of B-axis as an inclined surface angle; commands a position (Xp, Zp)=(0, 0) in the program coordinate system as the rotation center of the inclined surface; and changes the startup mode in the virtual Y-axis inclined surface machining mode into ON according to a description of "M37 B45. X0. Z0." in the machining program 53.

In a process (4), the numerical control device 1i performs a startup operation according to a description of "G0 X50. Y50. Z0." in the machining program 53. For example, the numerical control device 1i changes the tool 9061i to a state in which the tool 9061i is inclined such that the center axis is perpendicular to the inclined surface Wa of the work W and moves the tool 9061i to the machining start position (Xp, Yp, Zp)= (50, 50, 0). When the movement of the tool 9061i is completed, the numerical control device 1i changes the startup mode in the virtual Y-axis inclined surface machining mode into OFF and changes the virtual Y-axis inclined surface mode into ON.

In a process (5), the numerical control device 1i performs the virtual Y inclined surface machining operation according to a description of "G1 X50. Y−50. F100" in the machining program 53. For example, the numerical control device 1i moves the tool 9061i in the Y-axis (−) direction relatively to the inclined surface Wa of the work W and performs cutting. For example, the numerical control device 1i transforms an X-Y axis movement command "X50. Y−50." in the machining program 53 into a command in the X-Z-H coordinate system and drives the X axis, the Z axis, and the H axis in association with one another according to the transformed command.

In a process (6), the numerical control device 1i performs the virtual Y inclined surface machining operation according to a description of "G1 X−50. Y−50." in the machining program 53. For example, the numerical control device 1i moves the tool 9061i in the X-axis (−) direction relatively to the inclined surface Wa of the work W and performs cutting. For example, the numerical control device 1i transforms an X-Y axis movement command "X−50. Y−50." in the machining program 53 into a command in the X-Z-H coordinate system and drives the X axis and the Z axis in association with each other according to the transformed command.

In a process (7), the numerical control device 1i performs the virtual Y inclined surface machining operation according to a description of "G1 X−50. Y50." in the machining program 53. For example, the numerical control device 1i moves the tool 9061i in the Y-axis (+) direction relatively to the inclined surface Wa of the work W and performs cutting. For example, the numerical control device 1i transforms an X-Y axis movement command "X−50. Y50." in the machining program 53 into a command in the Z-Z-H coordinate system and drives the X axis, the Z axis, and the H axis in association with one another according to the transformed command.

In a process (8), the numerical control device 1i performs the virtual Y inclined surface machining operation according to a description of "G1 X50. Y50." in the machining program 53. For example, the numerical control device 1i moves the tool 9061i in the X-axis (−) direction relatively to the inclined surface Wa of the work W and performs cutting. For example, the numerical control device 1*i* transforms an X-Y axis movement command "X50. Y50." in the machining program 53 into a command in the X-Z-Y coordinate system and drives the X axis and the Y axis in association with each other according to the transformed command.

In a process (9), the numerical control device 1*i* retracts the tool 9061*i* according to a description of "G0 Z30." in the machining program 53. For example, the numerical control device 1*i* moves the tool 9061*i* in the Z-axis direction relatively to the inclined surface Wa of the work W and retracts the tool 9061*i* from the inclined surface Wa.

In a process (10), the numerical control device 1*i* cancels the virtual Y-axis inclined surface machining mode according to a description of "M38" in the machining program 53. For example, the numerical control device 1*i* changes the virtual Y-axis inclined surface mode in the virtual Y-axis inclined surface machining mode to OFF.

As described above, in the first embodiment, in the numerical control device 1*i*, the virtual Y-axis-inclined-surface-machining processing unit 60*i* performs, during the virtual Y-axis inclined surface machining mode, the virtual Y inclined surface machining for moving the tool 9061*i* along the Y axis relatively to the inclined surface Wa in the state in which the tool 9061*i* is inclined such that the center axis is perpendicular to the inclined surface Wa inclined from the X axis and the Z axis. For example, the virtual Y-axis-inclined-surface-machining processing unit 60*i* performs the virtual Y inclined surface interpolation for transforming the X-Y-Z axis movement command in the machining program into a command in the X-Z-H coordinate system and driving the X axis, the Z axis, and the H axis in association with one another according to the transformed command. Consequently, it is possible to apply, with the machine tool 900*i* not having the Y axis, the machining along the Y axis to the inclined surface Wa inclined from the X axis and the Z axis.

In the first embodiment, in the numerical control device 1*i*, the virtual Y-axis-inclined-surface-command-position creating unit 43*i* calculates a start point and an end point of the X-Y-Z axis movement command in the machining program 53. The interpolation processing unit 70 interpolates the X-Y-Z axis positions in the program coordinate system on the basis of the X-Y-Z axis movement command in the machining program 53. The virtual-plane-polar-coordinate transforming unit 61*i* calculates a polar coordinate including the rotation center coordinate of the H axis and the rotation angle of the H axis in the program coordinate system according to the interpolated X-Y-Z axis positions in the program coordinate system. The inclined-surface-coordinate-rotation transforming unit 63*i* interpolates the X-Z-H axis positions in the machine coordinate system according to the calculated polar coordinate in the program coordinate system. Consequently, it is possible to transform the X-Y-Z axis movement command in the machining program 53 into the X-Z-H axis movement command in the machine coordinate system.

In the first embodiment, in the numerical control device 1*i*, the virtual Y-axis-inclined-surface-machining startup unit 42*i* performs the startup operation for transforming a movement start position corresponding to the X-Y-Z axis movement command in the machining program 53 into a command in the X-Z-H-B coordinate system; driving the X axis, the Z axis, the H axis, and the B axis in association with one another according to the transformed command; changing the tool 9061*i* to an inclined state such that the center axis is perpendicular to the inclined surface Wa; and moving the tool 9061*i* to the machining start position of the work W. Consequently, the numerical control device 1*i* can be changed into a state in which it is possible to apply, with the machine tool 900*i* not having the Y axis, the machining along the Y axis to the inclined surface Wa inclined from the X axis and the Z axis.

Note that, in the example described in the first embodiment, information concerning the inclination angel and the inclined surface rotation center coordinate is commanded from the machining program. However, the information can be commanded from the PLC 36.

Alternatively, during the virtual Y-axis inclined surface machining mode, the information can be commanded to the B axis. For example, the machining program illustrated in FIG. 8(*b*) can be changed as described below.

G0 Z30. C0
T1010
M37 B45. X0. Z0.
G0 X50. Y50. Z0.
G1 X50. Y−50. F100
G1 X−25. Y−50. F75
M37 B55. X0. Z0.
G0 X−25. Y−50. Z0.
G1 X−50. Y−50. F25
G1 X−50. Y50. F100
G1 X−25. Y50. F25
M37 B45. X0. Z0.
G1 X50. Y50. F75
G0 Z30.
M38

In this case, for example, in the flowchart illustrated in FIG. 4, the processing of the startup operation (step S3) and the virtual Y inclined surface machining operation (step S4) are set into one routine. This one routine is repeated a plurality of times (in the case described above, three times) and then processing for cancellation of the virtual Y-axis inclined surface machining mode (step S5) is performed. In this case, as described above, when the startup operation (step S3) is performed every time, a different angle can be commanded as a rotation angle of the B axis.

By repeatedly giving commands to the B axis in this way, the turret can continuously machine inclined surfaces having different inclination angles of a machining surface with the tool distal end position being set as a center.

Alternatively, in the first embodiment, the milling is illustrated as the virtual Y inclined surface machining. However, the virtual Y inclined surface machining can be perforating, synchronous tap, and the like. For example, when the virtual Y inclined surface machining is the perforating, a machining procedure for the work W by the numerical control device 1*i* is, for example, as illustrated in FIG. 9. FIG. 9(*a*) is a diagram illustrating motions of the turret 906*i* and the work W conforming to the machining procedure for the work W by the numerical control device 1*i*. FIG. 9(*b*) is a diagram illustrating description contents in the machining program 53 stored in the storing unit 50*i* of the numerical control device 1*i*. FIG. 9(*c*) is a diagram illustrating the machining procedure for the work W.

In a modification of the first embodiment illustrated in FIG. 9, processes (11), (12), and (13) are performed instead of the processes (2) and (4) to (9).

In the process (11), the numerical control device 1*i* replaces the tool that should be used for machining with the tool 9062*i* for perforating according to a description of "T1111" in the machining program 53.

In the process (12), the numerical control device 1*i* performs the startup operation according to a description of "G0 X30. Y15. Z30." in the machining program 53. For example, the numerical control device 1*i* changes the tool 9062*i* to an inclined state such that the center axis is perpendicular to the inclined surface Wa of the work W and moves the tool 9062*i* to a machining start position (Xp, Yp, Zp)=(30, 15, 30) of the work W. When the movement of the tool 9062i is completed, the numerical control device 1i changes the startup mode in the virtual Y-axis inclined surface machining mode into OFF and changes the virtual Y-axis inclined surface mode into ON.

In the process (13), the numerical control device 1i performs the virtual Y inclined surface machining operation according to a description of "G84 Z−10. S100 F1. D5" in the machining program 53. For example, the numerical control device 1i moves the tool 9062i in the Z-axis (−) direction relatively to the inclined surface Wa of the work W and performs perforating. For example, the numerical control device 1i transforms a Z-axis movement command "Z−10." in the machining program 53 into a command in the X-Z-H coordinate system and moves the X axis, the Z axis, and the H axis in association with one another according to the transformed command.

Figure 10:
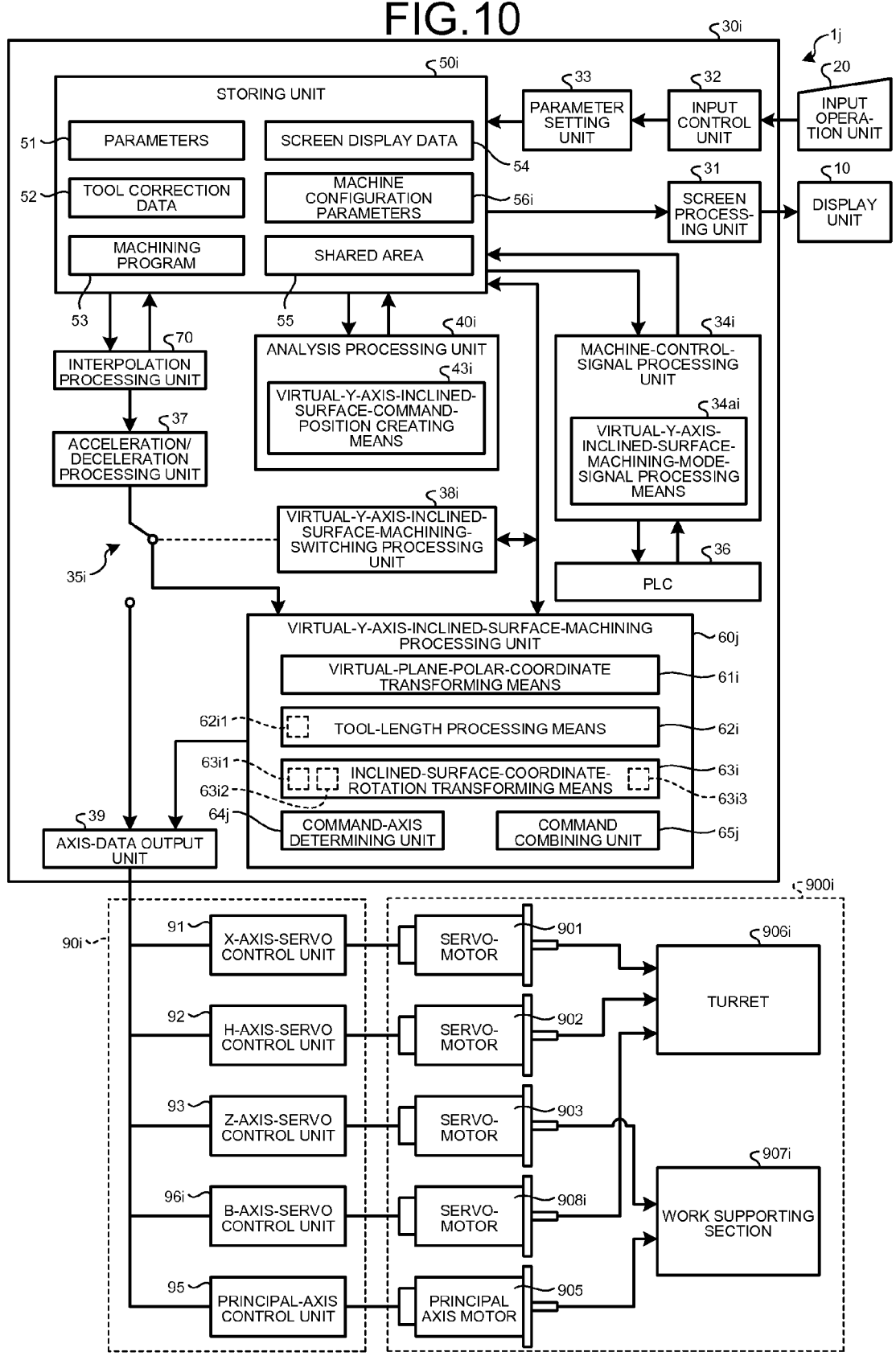
FIG. 10 is a diagram illustrating the configuration (during the virtual Y-axis inclined surface mode) of a numerical control device according to another modification of the first embodiment.

Alternatively, a numerical control device 1j illustrated in FIG. 10 may simultaneously perform, in parallel, during the virtual Y-axis inclined surface machining mode, both a first operation for moving a tool to the machining start position of the work W and a second operation for replacing the tool with another tool among a plurality of tools.

Specifically, in the numerical control device 1j, as illustrated in FIG. 10, an virtual Y-axis-inclined-surface-machining processing unit 60j further includes a command-axis determining unit 64j and a command combining unit 65j.

During the virtual Y-axis inclined surface machining mode, the command-axis determining unit 64j refers to, for each one block (one row), the machining program 53 stored in the storing unit 50i and determines whether a command of each block (each row) is a movement amount command for the X-Y-Z axes or an independent rotation amount command for the H axis. When the command by the machining program 53 is the movement amount command for the X-Y-Z axes (e.g., a movement amount command by "G0 X−50. Y50. Z0." illustrated in FIG. 11), the command-axis determining unit 64j supplies a movement amount command (i.e., a position command at every interpolation cycle) for the X-Y-Z axes input from the acceleration/deceleration processing unit 37 to the virtual-plane-polar-coordinate transforming unit 61i. When the command by the machining program 53 is the independent rotation amount command for the H axis (e.g., "T0202" illustrated in FIG. 11), the command-axis determining unit 64j supplies an independent rotation amount command for the H axis input from the acceleration/deceleration processing unit 37 to the command combining unit 65j. In other words, the command-axis determining unit 64j separates, for each one block, a command of the machining program 53 created in the program coordinate system into a first movement amount command (i.e., a position command at every interpolation cycle) including the movement amount command for the X-Y-Z axes and a second movement amount command including the H-axis independent movement amount command; supplies the first movement amount command to the virtual-plane-polar-coordinate transforming unit 61i; and supplies the second movement amount command to the command combining unit 65j.

As indicated by the following Expression 7, the command combining unit 65j combines an independent rotation command ΔHr2 (=ΔH2) for the H axis with a rotation amount command ΔHr1 for the H axis generated by the inclined-surface-coordinate-rotation transforming unit 63i and generates a rotation amount command ΔHr for the H axis.

$$\Delta Hr = \Delta Hr1 + \Delta Hr2 \qquad \text{Expression 7}$$

The command combining unit 65j supplies the combined rotation amount command ΔHr for the H axis to the axis-data output unit 39.

In this case, a machining procedure for the work W by the numerical control device 1j is, for example, as illustrated in FIG. 11. FIG. 11(a) is a diagram illustrating motions of the turret 906i and the work W conforming to the machining procedure for the work W by the numerical control device 1j. FIG. 11(b) is a diagram illustrating description contents in the machining program 53 stored in the storing unit 50i of the numerical control device 1j. FIG. 11(c) is a diagram illustrating the machining procedure for the work W.

In a modification of the first embodiment illustrated in FIG. 11, processes (21) to (23) are performed instead of the processes (6) to (8).

In the process (21), the numerical control device 1j retracts the tool 9061i according to a description of "G0 Z30." in the machining program 53. For example, the numerical control device 1j moves the tool 9061i in the Z-axis direction relatively to the inclined surface Wa of the work W and retracts the tool 9061i from the inclined surface Wa.

In the process (22), the numerical control device 1j replaces the tool that should be used for machining with the tool 9062i for perforating and moves the tool 9062i to the machining start position according to a description of "G0 X−50. Y50. Z0. T0202" in the machining program 53.

In the process (23), the numerical control device 1j performs the virtual Y inclined surface machining operation according to a description of "G1 X50. Y−50. F100" in the machining program 53. For example, the numerical control device 1j moves the tool 9061i in the Y-axis (−) direction relatively to the inclined surface Wa of the work W and performs cutting. For example, the numerical control device 1j transforms the X-Y axis movement command "X50. Y−50." in the machining program 53 into a command in the X-Z-H coordinate system and moves the X axis, the Z axis, and the H axis in association with one another according to the transformed command.

By simultaneously performing the machining start position determination and the tool replacement in this way, it is possible to reduce a machining time.

Second Embodiment

Figure 12:
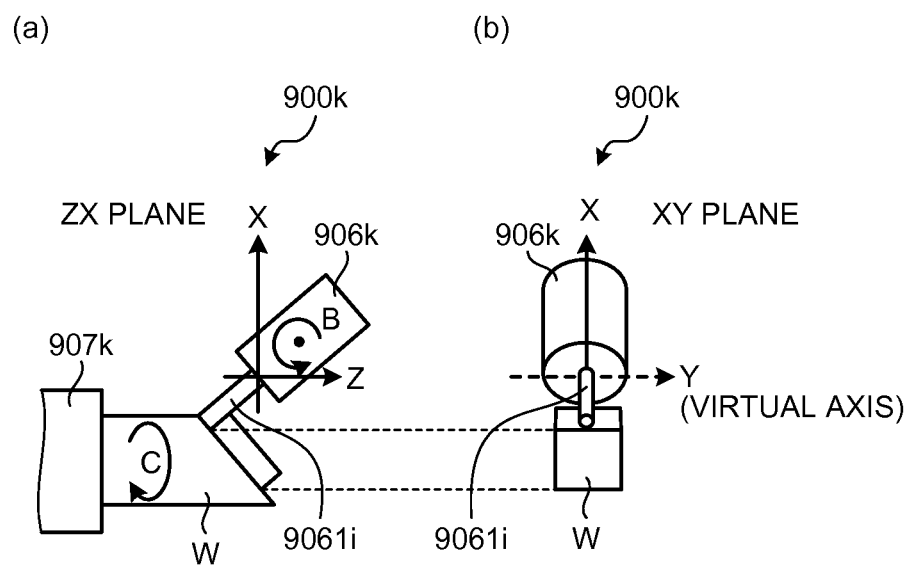
FIG. 12 is a diagram illustrating the configuration of a machine tool in a second embodiment.
Figure 13:
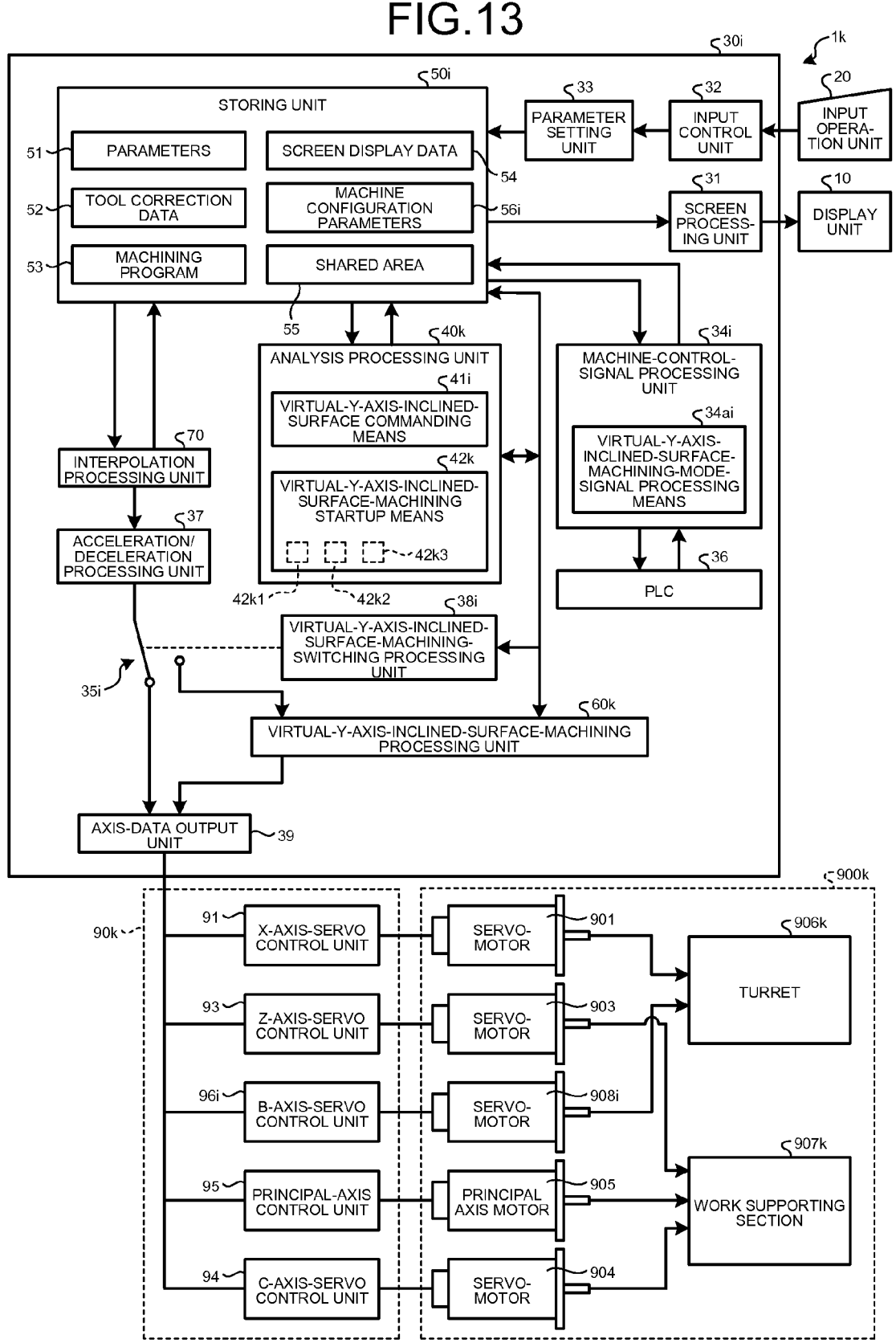
FIG. 13 is a diagram illustrating the configuration (during a startup mode) of a numerical control device according to the second embodiment.
Figure 14:
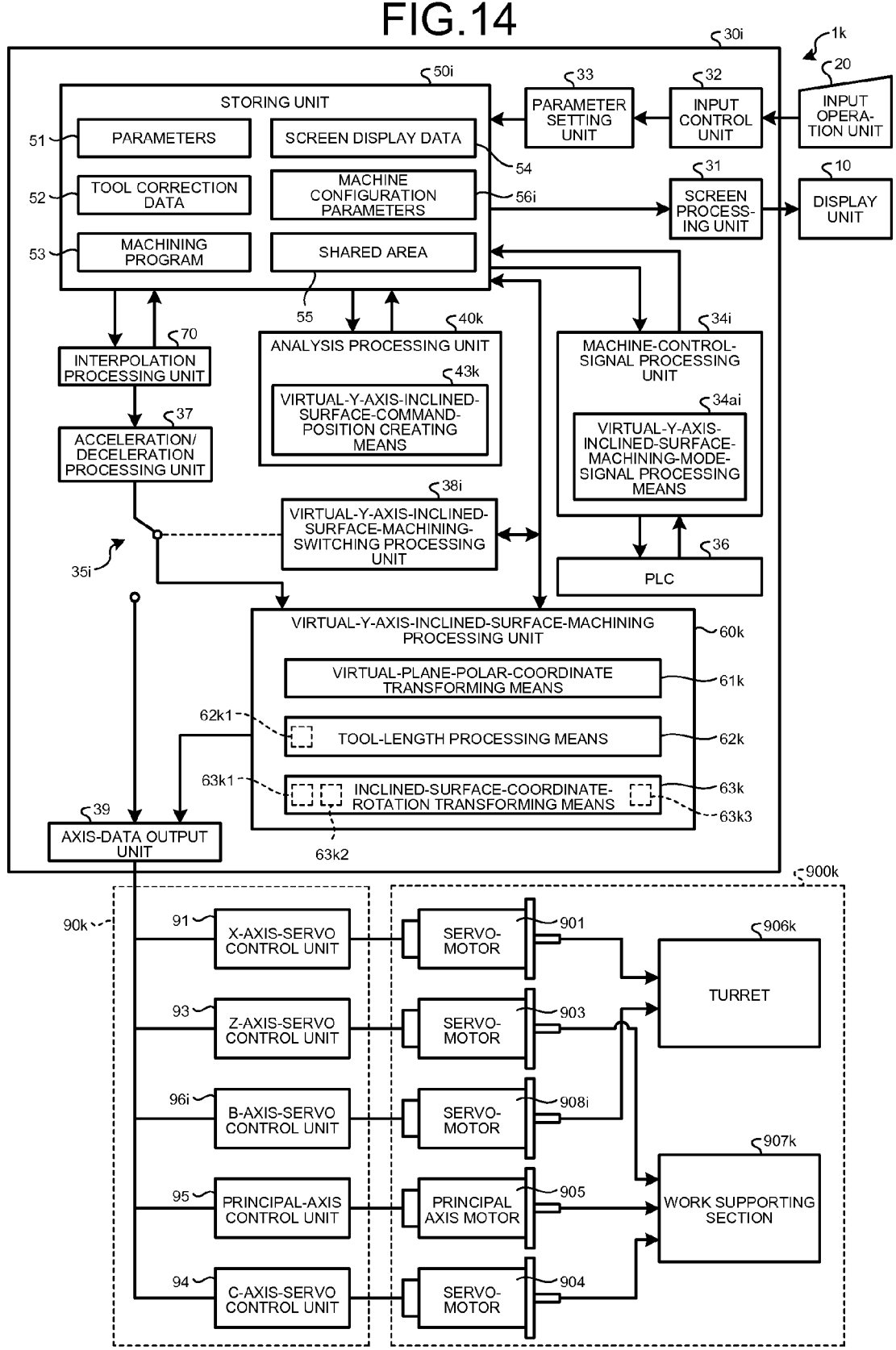
FIG. 14 is a diagram illustrating the configuration (during a virtual Y-axis inclined surface mode) of the numerical control device according to the second embodiment.

A numerical control device 1k according to a second embodiment is described with reference to FIG. 12 to FIG. 15. FIG. 12(a) and FIG. 12(b) are respectively diagrams of the external configuration of a machine tool 900k, which is controlled by the numerical control device 1k according to the second embodiment, viewed from directions perpendicular to a ZX plane and an XY plane. FIG. 13 is a block diagram illustrating a configuration related to the operation during a startup mode of the numerical control device 1k according to the second embodiment. FIG. 14 is a block diagram illustrating components related to the operation during a virtual Y-axis inclined surface mode of the numerical control device 1k according to the second embodiment. FIG. 15 is a diagram illustrating motions of axes during the virtual Y-axis inclined surface mode of the numerical control device according to the second embodiment. In the following description, differences from the first embodiment are mainly described.

In the first embodiment, the X axis, the Z axis, and the H axis are driven in association with one another to realize movement in the virtual Y-axis direction. However, in the second embodiment, the X axis, the Z axis, and the C axis are driven in association with one another to realize movement in the virtual Y-axis direction.

The machine tool 900k includes, as illustrated in FIGS. 12(a) and 12(b), a turret 906k and a work supporting section 907k. The machine tool 900k does not have the H axis and further has the C axis. The C axis is a rotation axis for rotating the work W around a rotation center line parallel to the Z axis. For example, one tool 9061i is attached to the turret 906k.

As illustrated in FIGS. 13 and 14, the machine tool 900k does not include the H-axis servomotor 902 and further includes the C-axis servomotor 904. The C-axis servomotor 904 rotates the C axis with respect to the work W. Accordingly, a driving unit 90k does not include the H-axis-servo control unit 92 and further includes the C-axis-servo control unit 94.

In the numerical control device 1k, as illustrated in FIG. 13, during the startup mode, because the numerical control device 1k is in the startup mode, a virtual Y-axis-inclined-surface-machining startup unit 42k of an analysis processing unit 40k transforms a movement start position corresponding to the X-Y-Z axis movement command in the machining program 53 into a command in an X-Z-C-B coordinate system, drives the X axis, the Z axis, the C axis, and the B axis in association with one another according to the transformed command, and performs a startup operation.

For example, a virtual-plane-polar-coordinate transforming unit 42k1 calculates a polar coordinate of the C axis in the program coordinate system according to a movement start position corresponding to the X-Y-Z axis movement command in the machining program 53. The polar coordinate of the C axis includes a rotation center coordinate of the C axis and a rotation angle of the C axis. The rotation center coordinate of the C axis indicates a coordinate of the rotation center of the C axis in the program coordinate system. The rotation angle of the C axis is a rotation coordinate indicating a rotation angle from a reference rotation position of the C axis centering on the rotation center of the C axis. For example, the virtual-plane-polar-coordinate transforming unit 42k1 transforms an X-Y-Z axis command position into a polar coordinate of the C axis in the program coordinate system.

A tool-length processing unit 42k2 corrects the calculated rotation center coordinate of the C axis taking into account the tool length of the tool 9061i and supplies a parameter corresponding to the corrected rotation center coordinate of the C axis to inclined-surface-coordinate-rotation transforming unit 42k3.

The inclined-surface-coordinate-rotation transforming unit 42k3 refers to the shared area 55 of the storing unit 50i and acquires a commanded inclined surface angle and a commanded inclined surface rotation center. The inclined-surface-coordinate-rotation transforming unit 42k3 calculates, using the parameter corresponding to the corrected rotation center coordinate of the C axis in the program coordinate system, a movement start position of the X axis and a movement start position of the Z axis for moving the X axis and the Z axis when the B axis is rotated according to the commanded inclined surface angle and the commanded inclined surface rotation center. That is, the inclined-surface-coordinate-rotation transforming unit 42k3 calculates, according to the corrected rotation center coordinate of the C axis in the program coordinate system and the commanded inclined surface angle and the commanded inclined surface rotation center, a moving position command for the X axis, a moving position command for the Z axis, a rotating position command for the C axis, and a rotating position command for the B axis, which are commands for a movement start position of the machine coordinate system serving as a real coordinate system; and calculates movement start positions (Xr, Zr, Cr, Br) of the X axis, the Z axis, the C axis, and the B axis. The analysis processing unit 40k supplies commands of the movement start positions (Xr, Zr, Cr, Br) to the driving unit 90k via the interpolation processing unit 70 and the acceleration/deceleration processing unit 37. Consequently, the driving unit 90k drives the X axis, the Z axis, the C axis, and the B axis in association with one another according to the commands of the movement start positions (Xr, Zr, Cr, Br).

In the numerical control device 1k, as illustrated in FIG. 14, during the virtual Y-axis inclined surface mode, a virtual Y-axis-inclined-surface-command-position creating unit 43k of the analysis processing unit 40k calculates, for example, positions of a start point and an end point of a present processing target block in the machining program 53 and calculates an X-Y-Z axis movement command in the machining program 53. The interpolation processing unit 70 interpolates X-Y-Z axis positions in the program coordinate system at every interpolation cycle, according to the X-Y-Z axis movement command in the machining program 53.

For example, the virtual Y-axis-inclined-surface-command-position creating unit 43k calculates the start point and the end point of the present processing target block in the machining program 53 and calculates an X-Y-Z axis movement command in the machining program 53. The interpolation processing unit 70 interpolates, according to the X-Y-Z axis movement command in the machining program 53, the X-Y-Z axis positions in the program coordinate system at every interpolation cycle.

For example, it is assumed that a start point P1' and an end point P3' of the block is calculated by the virtual Y-axis-inclined-surface-command-position creating unit 43k, that is, the X-Y-Z axis movement command in the machining program 53 is a movement command of P1' to P3' illustrated in FIGS. 15(c) to 15(e). In this case, the interpolation processing unit 70 performs interpolation processing at every interpolation cycle and calculates command positions P1', P11', P12', P2', P21', P22', and P3' of the X-Y-Z axes in the program coordinate system. The command positions P1' to P3' are positions along the Y axis, which is the virtual axis, as illustrated in FIGS. 15(a) and 15(b).

Note that FIG. 15(a) illustrates the operation of the machine tool 900k conforming to the command positions P1', P2', and P3' when viewed from a direction perpendicular to the ZX plane. FIG. 15(b) illustrates the operation of the machine tool 900k conforming to the command positions P1', P2', and P3' when viewed from a direction perpendicular to the XY plane. FIG. 15(c) illustrates a route commanded in the program coordinate system on the YZ plane and a moving route of the machine tool in the machine coordinate system. In FIG. 15(c), the ordinate indicates a coordinate of the Y axis and the abscissa indicates a coordinate of the Z axis. FIG. 15(d) illustrates a route commanded in the program coordinate system on the XY plane and a moving route of the machine tool in the machine coordinate system. In FIG. 15(d), the ordinate indicates a coordinate of the X axis and the abscissa indicates a coordinate of the Y axis. FIG. 15(e) illustrates a route commanded in the program coordinate system on a CY plane and a moving route of the machine tool in the machine coordinate system. In FIG. 15(e), the ordinate indicates a rotation coordinate (c) of the C axis and the abscissa indicates a coordinate of the Y axis.

A virtual-plane-polar-coordinate transforming unit 61k of an virtual Y-axis-inclined-surface-machining processing unit 60k calculates a polar coordinate of the C axis in the program coordinate system according to the interpolated X-Y-Z axis positions in the program coordinate system. The polar coordinate of the C axis includes a rotation center coordinate of the C axis and a rotation angle of the C axis. The rotation center coordinate of the C axis indicates a coordinate of the rotation center of the C axis in the program coordinate system. The rotation angle of the C axis is a rotation coordinate indicating a rotation angle from the reference rotation position of the C axis centering on the rotation center of the C axis. For example, the virtual-plane-polar-coordinate transforming unit 61k transforms the interpolated X-Y-Z axis positions into a polar coordinate of the C axis in the program coordinate system.

A tool-length processing unit 62k corrects the calculated rotation center coordinate of the C axis taking into account the tool length of the tool 9061i. For example, the tool-length processing unit 62k includes a tool distal end to B-axis-rotation-center-vector calculating unit 62k1. The tool-length processing unit 62k applies tool length correction to the rotation center coordinate of the C axis using the tool distal end to B-axis-rotation-center-vector calculating unit 62k1 and supplies a parameter corresponding to the corrected rotation center coordinate of the C axis to inclined-surface-coordinate-rotation transforming unit 63k.

The inclined-surface-coordinate-rotation transforming unit 63k refers to the shared area 55 of the storing unit 50i and acquires the commanded inclined surface angle and the commanded inclined surface rotation center. The inclined-surface-coordinate-rotation transforming unit 63k calculates, using the parameter corresponding to the corrected rotation center coordinate of the C axis in the program coordinate system, a movement position command for the X axis and a movement position command for the Z axis for moving the X axis and the Z axis when the B axis is rotated according to the commanded inclined surface angle and the commanded inclined surface rotation center. That is, the inclined-surface-coordinate-rotation transforming unit 63k calculates, according to the corrected rotation center coordinate of the C axis in the program coordinate system and the commanded inclined surface angle and the commanded inclined surface rotation center, a moving position command for the X axis, a moving position command for the Z axis, and a rotating position command for the C axis, which are moving position commands for the machine coordinate system serving as a real coordinate system; and calculates moving positions (Xr, Zr, Cr) of the X axis, the Z axis, and the C axis. For example, the inclined-surface-coordinate-rotation transforming unit 63k includes a virtual-coordinate-command-position-coordinate-rotation transforming unit 63k1, a tool distal end to B-axis-rotation-center-coordinate-rotation transforming unit 63k2, and a combining unit 63k3. The inclined-surface-coordinate-rotation transforming unit 63k calculates the moving positions (Xr, Zr, Cr) of the X axis, the Z axis, and the C axis using the virtual-coordinate-command-position-coordinate-rotation transforming unit 63k1, the tool distal end to B-axis-rotation-center-coordinate-rotation transforming unit 63k2, and the combining unit 63k3. That is, the virtual Y-axis-inclined-surface-machining processing unit 60k transforms the command position on the program coordinate system analyzed by the analysis processing unit 40k, interpolated by the interpolation processing unit 70, and subjected to the acceleration/deceleration processing by the acceleration/deceleration processing unit 37 into a command position on the machine coordinate system. The command position on the machine coordinate system is supplied to the driving unit 90k. Consequently, the driving unit 90k drives the X axis, the Z axis, and the C axis in association with one another according to the command position on the machine coordinate system.

For example, it is assumed that the X-Y-Z axis movement command in the machining program 53 is a movement command of P1' to P3' illustrated in FIGS. 15(c) to 15(e). In this case, the inclined-surface-coordinate-rotation transforming unit 63k calculates command positions P1r', P11r', P12r', P2r', P21r', P22r', and P3r' of the X-Z-C axes in the machine coordinate system. The command positions P1r', P11r', P12r', P2r', P21r', P22r', and P3r' of the X-Z-C axes in the machine coordinate system respectively correspond to the command positions P1', P11', P12', P2', P21', P22', and P3' of the X-Y-Z axes in the program coordinate system. The command positions P1r' to P3r' are realized by the associated driving of the X axis, the Z axis, and the C axis by the driving unit 90k as illustrated in FIGS. 15(a) and 15(b).

As described above, in the second embodiment, in the numerical control device 1k, the virtual Y-axis-inclined-surface-machining processing unit 60k performs, during the virtual Y-axis inclined surface machining mode, the virtual Y inclined surface machining for moving the tool 9061i along the Y axis relatively to the inclined surface Wa in the state in which the tool 9061i is inclined such that the center axis is perpendicular to the inclined surface Wa inclined from the X axis and the Z axis. For example, the virtual Y-axis-inclined-surface-machining processing unit 60k transforms the X-Y-Z axes moving command in the processing program into a command in the X-Z-C axes into a command in the X-Z-C axes; and performs the virtual Y inclined surface interpolation for driving the X axis, the Z axis, and the C axis in association with one another according to the transformed command. Consequently, it is possible to apply, with the machine tool 900k not having the Y axis, the machining along the Y axis to the inclined surface Wa inclined from the X axis and the Z axis.

In the second embodiment, in the numerical control device 1k, the virtual Y-axis-inclined-surface-command-position creating unit 43k calculates a start point and an end point of the X-Y-Z axis movement command in the machining program 53. The interpolation processing unit 70 interpolates the X-Y-Z axis positions in the program coordinate system on the basis of the X-Y-Z axis movement command in the machining program 53. The virtual-plane-polar-coordinate transforming unit 61k calculates a polar coordinate including the rotation center coordinate of the C axis and the rotation angle of the C axis in the program coordinate system according to the interpolated X-Y-Z axis positions in the program coordinate system. The inclined-surface-coordinate-rotation transforming unit 63k interpolates the X-Y-C axis positions in the machine coordinate system according to the calculated polar coordinate in the program coordinate system. Consequently, it is possible to transform the X-Y-Z axis movement command in the machining program 53 into the X-Z-C axis movement command in the machine coordinate system.

In the second embodiment, in the numerical control device 1k, the virtual Y-axis-inclined-surface-machining startup unit 42k performs the startup operation for: transforming a movement start position corresponding to the X-Y-Z axis movement command in the machining program 53 into a command in the X-Z-C-B coordinate system; driving the X axis, the Z axis, C axis, and the B axis in association with one another according to the transformed command; changing the tool 9061i to an inclined state such that the center axis is perpendicular to the inclined surface Wa; and moving the tool 9061i to the machining start position of the work W. Consequently, the numerical control device 1k can be changed into a state in which it is possible to apply, with the machine tool 900k not having the Y axis, the machining along the Y axis to the inclined surface Wa inclined from the X axis and the Z axis.

Figure 16:
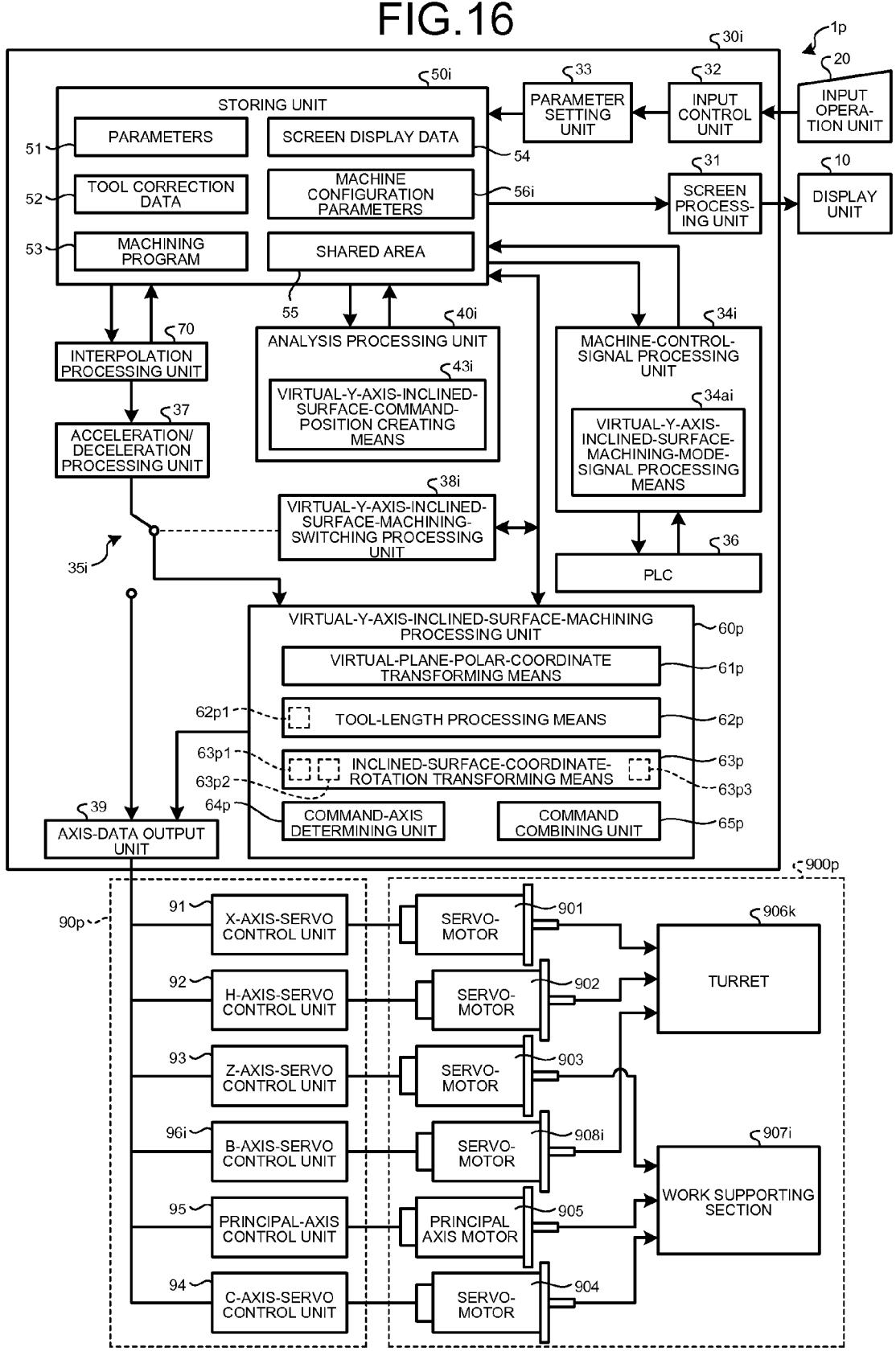
FIG. 16 is a diagram illustrating the configuration (during the virtual Y-axis inclined surface mode) of a numerical control device according to a modification of the second embodiment.

Note that a machine tool 900p can have both of the H axis and the C axis. In this case, the machine tool 900p includes, as illustrated in FIG. 16, both of the H-axis servomotor 902 and the C-axis servomotor 904. Accordingly, a driving unit 90$p$ includes both of the H-axis-servo control unit 92 and the C-axis-servo control unit 94. Note that the turret 906$k$ can be the same as the turret 906$i$ in the first embodiment.

In this case, a numerical control device 1$p$ can simultaneously perform, in parallel, during the virtual Y-axis inclined surface machining mode, a first operation for moving a tool to the machining start position of the work W and at least one operation of a second operation for replacing the tool with another tool among a plurality of tools and a third operation for performing positioning of the work.

Specifically, in the numerical control device 1$p$, as illustrated in FIG. 16, an virtual Y-axis-inclined-surface-machining processing unit 60$p$ further includes a virtual-plane-polar-coordinate transforming unit 61$p$, a tool-length processing unit 62$p$, an inclined-surface-coordinate-rotation transforming unit 63$p$, a command-axis determining unit 64$p$, and a command combining unit 65$p$.

The virtual-plane-polar-coordinate transforming unit 61$p$ has, for example, both of the function of the virtual-plane-polar-coordinate transforming unit 61$i$ (see FIG. 3) and the function of the virtual-plane-polar-coordinate transforming unit 61$k$ (see FIG. 14).

The tool-length processing unit 62$p$ has, for example, both of the function of the tool-length processing unit 62$i$ (see FIG. 3) and the function of the tool-length processing unit 62$k$ (see FIG. 14). The tool-length processing unit 62$p$ includes a tool distal end to B-axis-rotation-center-vector calculating unit 62$p$1. The tool distal end to B-axis-rotation-center-vector calculating unit 62$p$1 has, for example, both of the function of the tool distal end to B-axis-rotation-center-vector calculating unit 62$i$1 (see FIG. 3) and the function of the tool distal end to B-axis-rotation-center-vector calculating unit 62$k$1 (see FIG. 14).

The inclined-surface-coordinate-rotation transforming unit 63$p$ has, for example, both of the function of the inclined-surface-coordinate-rotation transforming unit 63$i$ (see FIG. 3) and the function of the inclined-surface-coordinate-rotation transforming unit 63$k$ (see FIG. 14). The inclined-surface-coordinate-rotation transforming unit 63$p$ includes a virtual-coordinate-command-position-coordinate-rotation transforming unit 63$p$1; a tool distal end to B-axis-rotation-center-coordinate-rotation transforming unit 63$p$2; and a combining unit 63$p$3. The virtual-coordinate-command-position-coordinate-rotation transforming unit 63$p$1 has, for example, both of the function of the virtual-coordinate-command-position-coordinate-rotation transforming unit 63$i$1 (see FIG. 3) and the function of the virtual-coordinate-command-position-coordinate-rotation transforming unit 63$k$1 (see FIG. 14). The tool distal end to B-axis-rotation-center-coordinate-rotation transforming unit 63$p$2 has, for example, both the function of the tool distal end to B-axis-rotation-center-coordinate-rotation transforming unit 63$i$2 (see FIG. 3) and the function of the tool distal end to B-axis-rotation-center-coordinate-rotation transforming unit 63$k$2 (see FIG. 14). The combining unit 63$p$3 has, for example, both of the function of the combining unit 63$i$3 (see FIG. 3) and the function of the combining unit 63$k$3 (see FIG. 14).

During the virtual Y-axis inclined surface machining mode, the command-axis determining unit 64$p$ refers to, for each one block (one row), the machining program 53 stored in the storing unit 50$i$ and determines whether a command of each block (each row) (e.g., "G0 X−50. Y50. Z0. T0202 C180") is a movement amount command for the X-Y-Z axes or an independent rotation amount command for the H axis or the C axis. When the command by the machining program 53 is the movement amount command for the X-Y-Z axes (e.g., a movement amount command by "G0 X−50. Y50. Z0."), the command-axis determining unit 64$p$ supplies a movement amount command (i.e., a position command at every interpolation cycle) for the X-Y-Z axes input from the acceleration/deceleration processing unit 37 to the virtual-plane-polar-coordinate transforming unit 61$p$. When the command by the machining program 53 is the independent rotation amount command for the H axis or the C axis (e.g., "T0202" or "C180"), the command-axis determining unit 64$p$ supplies an independent rotation amount command for the H axis or the C axis input from the acceleration/deceleration processing unit 37 to the command combining unit 65$p$. In other words, the command-axis determining unit 64$p$ separates a command of the machining program 53 created in the program coordinate system into a first movement amount command (i.e., a position command at every interpolation cycle) including the movement amount command for the X-Y-Z axes and a second movement amount command including any one of the H-axis independent movement amount command and the C-axis independent movement amount command or both; supplies the first movement amount command to the virtual-plane-polar-coordinate transforming unit 61$p$; and supplies the second movement amount command to the command combining unit 65$p$.

As indicated by the following Expression 8, the command combining unit 65$p$ combines an independent rotation command $\Delta Hr2'$ ($=\Delta H2'$) for the H axis with a rotation amount command $\Delta Hr1'$ for the H axis generated by the inclined-surface-coordinate-rotation transforming unit 63$p$ and generates a rotation amount command $\Delta Hr$ for the H axis.

$$\Delta Hr = \Delta Hr1' + \Delta Hr2' \qquad \text{Expression 8}$$

Similarly, as indicated by the following Expression 9, the command combining unit 65$p$ combines an independent rotation command $\Delta Cr2$ ($=\Delta C2$) for the C axis with a rotation amount command $\Delta Cr1$ for the C axis generated by the inclined-surface-coordinate-rotation transforming unit 63$p$ and generates a rotation amount command $\Delta Cr$ for the C axis.

$$\Delta Cr = \Delta Cr1 + \Delta Cr2 \qquad \text{Expression 9}$$

The command combining unit 65$p$ supplies the combined rotation amount command $\Delta Hr$ for the H axis and the rotation amount command $\Delta Cr$ for the C axis to the axis-data output unit 39.

In this case, for example, during the virtual Y-axis inclined surface machining mode, the numerical control device 1$p$ can replace the tool that should be used for machining with the tool 9062$i$ for perforating and reverse the work W 180° while moving the tool 9062$i$ to the machining start position according to a description of "G0 X−50. Y50. Z0. T0202 C180" in the machining program 53.

By simultaneously performing the machining start position determination, the tool replacement, and the positioning of the work in this way, it is possible to further reduce the machining time.

Alternatively, during the virtual Y-axis inclined surface machining mode, the information can be commanded to the B axis. For example, the machining program can be changed as described below.

G0 Z30. C0
T1010
M37 B45. X0. Z0.
G0 X50. Y50. Z0.
G1 X50. Y−50. F100
G1 X−25. Y−50. F75

M37 B55. X0. Z0.
G0 X−25. Y−50. Z0.
G1 X−50. Y−50. F25
G1 X−50. Y50. F100
G1 X−25. Y50. F25
M37 B45. X0. Z0.
G1 X50. Y50. F75
G0 Z30.
M38

In this case, for example, in the flowchart illustrated in FIG. 4, the processing of the startup operation (step S3) and the virtual Y inclined surface machining operation (step S4) are set into one routine. This one routine is repeated a plurality of times (in the case described above, three times) and then processing for cancellation of the virtual Y-axis inclined surface machining mode (step S5) is performed. In this case, as described above, when the startup operation (step S3) is performed every time, a different angle can be commanded as a rotation angle of the B axis.

By repeatedly commanding the angle to the B axis in this way, the turret can continuously machine inclined surfaces having different inclination angles of a machining surface centering on the tool distal end position.

INDUSTRIAL APPLICABILITY

As described above, the numerical control device according to the present invention is useful for the machine tool not having the Y axis.

REFERENCE SIGNS LIST 1, 1$i$, 1$j$, 1$k$, 1$p$ Numerical control devices
10 Display unit
20 Input operation unit
30 Control operation unit
31 Screen processing unit
32 Input control unit
33 Parameter setting unit
34, 34$i$ Machine-control-signal processing unit
34$a$ Virtual Y-axis-control-mode-signal processing unit
34$ai$ Virtual Y-axis-inclined-surface-machining-mode-signal processing unit
35, 35$i$ Switch
36 PLC
37 Acceleration/deceleration processing unit
38 Virtual Y-axis-control-switching processing unit
38$i$ Virtual Y-axis-inclined-surface-machining-switching processing unit
39 Axis-data output unit
40, 40$i$, 40$k$ Analysis processing unit
41$i$ Virtual Y-axis-inclined-surface-machining commanding unit
42$i$, 42$k$ Virtual Y-axis-inclined-surface-machining startup unit
42$i$1, 42$k$1 Virtual-plane-polar-coordinate transforming unit
42$i$2, 42$k$2 Tool-length processing unit
42$i$3, 42$k$3 Inclined-surface-coordinate-rotation transforming unit
43$i$, 43$k$ Virtual Y-axis-inclined-surface-command-position creating unit
50, 50$i$ Storing units
51 Parameter
52 Tool correction data
53 Machining program
54 Screen display data
55 Shared area
56$i$ Machine configuration parameter
60 Virtual Y-axis-control processing unit
60$i$, 60$j$, 60$k$, 60$p$ Virtual Y-axis-inclined-surface-machining processing unit
61$i$, 61$k$, 61$p$ Virtual-plane-polar-coordinate transforming unit
62$i$, 62$k$, 62$p$ Tool-length processing unit
62$i$1, 62$k$1, 62$p$1 Tool distal end to B-axis-rotation-center-vector calculating unit
63$i$, 63$k$, 63$p$ Inclined-surface-coordinate-rotation transforming unit
63$i$1, 63$k$1, 63$p$1 Virtual-coordinate-command-position-coordinate-rotation transforming unit
63$i$2, 63$k$2, 63$p$2 Tool distal end to B-axis-rotation-center-coordinate-rotation transforming unit
63$i$3, 63$k$3, 63$p$3 Combining unit
64$j$, 64$p$ Command-axis determining units
65$j$, 65$p$ Command combining units
70 Interpolation processing unit
90, 90$i$, 90$k$, 90$p$ Driving units
91 X-axis-servo control unit
92 H-axis-servo control unit
93 Z-axis-servo control unit
94 C-axis-servo control unit
95 Principal-axis control unit
900, 900$i$, 900$k$ Machine tool
901 X-axis servomotor
902 H-axis servomotor
903 Z-axis servomotor
904 C-axis servomotor
905 Principal axis motor
906, 906$i$, 906$k$ Turrets
907, 907$i$, 907$k$ Work supporting section

The invention claimed is:
1. A numerical control device that controls a machine tool having
    an X axis for moving a turret to which a tool is attached,
    a Z axis for moving work, and
    a B axis for rotating the turret around a center line perpendicular to the X axis and the Z axis,
having at least one of an H axis for rotating the turret around a center line perpendicular to a center line of rotation of the B axis and a C axis for rotating the work around a center line parallel to the Z axis, and
not having a Y axis orthogonal to the X axis and the Z axis,
the numerical control device comprising:
a unit that performs, during a virtual Y-axis inclined surface machining mode for controlling the tool to move along X-Y-Z axes relatively to the work according to an X-Y-Z axis movement command in a machining program, virtual Y inclined surface machining for moving the tool along the Y axis relatively to the inclined surface in a state in which the tool is inclined such that a center axis is perpendicular to an inclined surface inclined from the X axis and the Z axis, wherein
a center axis of the tool
    extends in parallel to a rotation center line of the H axis, and
    is apart from the rotation center line of the H axis.

2. The numerical control device according to claim 1, wherein
the machine tool has the H axis, and
the unit that performs the virtual Y inclined surface machining includes
a unit that performs virtual Y inclined surface interpolation for
transforming the X-Y-Z axis movement command in the machining program into a command in an X-Z-H coordinate system and
driving the X axis, the Z axis, and the H axis in association with one another according to the transformed command.

3. The numerical control device according to claim 1, wherein
the machine tool has the C axis, and
the unit that performs the virtual Y inclined surface machining includes
a unit that performs virtual Y inclined surface interpolation for
transforming the X-Y-Z axis movement command in the machining program into a command in an X-Z-C coordinate system and
driving the X axis, the Z axis, and the C axis in association with one another according to the transformed command.

4. The numerical control device according to claim 2, wherein
the unit that performs the virtual Y inclined surface interpolation includes:
an X-Y-Z-axis interpolating unit that interpolates X-Y-Z axis positions in a program coordinate system on the basis of the X-Y-Z axis movement command in the machining program;
a polar-coordinate transforming unit that calculates, according to the interpolated X-Y-Z axis positions in the program coordinate system, a polar coordinate including a rotation center coordinate of the H axis and a rotation angle of the H axis in the program coordinate system; and
an X-Z-H-axis interpolating unit that interpolates X-Z-H axis positions in a machine coordinate system according to the calculated polar coordinate in the program coordinate system.

5. The numerical control device according to claim 3, wherein
the unit that performs the virtual Y inclined surface interpolation includes:
an X-Y-Z-axis interpolating unit that interpolates X-Y-Z axis positions in a program coordinate system on the basis of the X-Y-Z axis movement command in the machining program;
a polar-coordinate transforming unit that calculates, according to the interpolated X-Y-Z axis positions in the program coordinate system, a polar coordinate including a rotation center coordinate of the C axis and a rotation angle of the C axis in the program coordinate system; and
an X-Z-C-axis interpolating unit that interpolates X-Z-C axis positions in a machine coordinate system according to the calculated polar coordinate in the program coordinate system.

6. The numerical control device according to claim 1, wherein
the machine tool has the H axis, and
the unit that performs the virtual Y inclined surface machining includes
a unit that performs a startup operation for
transforming a movement start position corresponding to the X-Y-Z axis movement command in the machining program into a command in an X-Z-H-B coordinate system,
driving the X axis, the Z axis, the H axis, and the B axis in association with one another according to the transformed command, and
changing the tool to an inclined state such that a center axis is perpendicular to the inclined surface and moving the tool to a machining start position of the work.

7. The numerical control device according to claim 1, wherein
the machine tool has the C axis, and
the unit that performs the virtual Y inclined surface machining includes
a unit that performs a startup operation for
transforming a movement start position corresponding to the X-Y-Z axis movement command in the machining program into a command in an X-Z-C-B coordinate system,
driving the X axis, the Z axis, the C axis, and the B axis in association with one another according to the transformed command, and
changing the tool to an inclined state such that a center axis is perpendicular to the inclined surface and moving the tool to a machining start position of the work.

8. The numerical control device according to claim 1, wherein
the unit that performs the virtual Y inclined surface machining simultaneously performs, in parallel, during the virtual Y-axis inclined surface machining mode,
a first operation for moving the tool to a machining start position of the work and
at least one of a second operation for replacing the tool and a third operation for performing positioning of the work.

9. The numerical control device according to claim 6, wherein
the unit that performs the startup operation repeatedly gives commands to the B axis during the virtual Y-axis inclined surface machining mode, and
the unit that performs the virtual Y inclined surface machining continuously machines inclined surfaces having different inclination angles.

10. The numerical control device according to claim 7, wherein
the unit that performs the startup operation repeatedly gives commands to the B axis during the virtual Y-axis inclined surface machining mode, and
the unit that performs the virtual Y inclined surface machining continuously machines inclined surfaces having different inclination angles.

* * * * *